(12) United States Patent
Lee et al.

(10) Patent No.: US 8,311,152 B1
(45) Date of Patent: Nov. 13, 2012

(54) ADAPTIVE OFDM RECEIVER BASED ON CARRIER FREQUENCY OFFSET

(75) Inventors: Jungwon Lee, Stanford, CA (US);
Hui-Ling Lou, Palo Alto, CA (US);
Dimitrios-Alexandros Toumpakaris,
Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 2600 days.

(21) Appl. No.: 10/986,110

(22) Filed: Nov. 10, 2004

Related U.S. Application Data

(60) Provisional application No. 60/585,651, filed on Jul. 6, 2004, provisional application No. 60/568,713, filed on May 6, 2004, provisional application No. 60/568,555, filed on May 6, 2004, provisional application No. 60/557,327, filed on Mar. 29, 2004, provisional application No. 60/550,676, filed on Mar. 5, 2004, provisional application No. 60/548,206, filed on Feb. 27, 2004, provisional application No. 60/548,205, filed on Feb. 27, 2004.

(51) Int. Cl.
*H03K 9/00* (2006.01)
*H04L 27/22* (2006.01)
*H04L 23/00* (2006.01)
*H04J 11/00* (2006.01)

(52) U.S. Cl. ......... 375/316; 375/326; 375/377; 370/208
(58) Field of Classification Search .................. 375/316, 375/326, 377; 370/208, 210
See application file for complete search history.

(56) References Cited

U.S. PATENT DOCUMENTS

| | | | | |
|---|---|---|---|---|
| 5,170,415 A * | 12/1992 | Yoshida et al. | ............... | 375/326 |
| 5,471,508 A * | 11/1995 | Koslov | ........................... | 375/344 |
| 5,627,861 A * | 5/1997 | Kataoka | ....................... | 375/324 |
| 5,715,240 A * | 2/1998 | Borras et al. | .................. | 370/252 |
| 5,790,604 A * | 8/1998 | Kelton et al. | .................. | 375/344 |
| 5,940,450 A * | 8/1999 | Koslov et al. | .................. | 375/344 |
| 5,987,084 A * | 11/1999 | Farmer | .......................... | 375/371 |
| 6,178,194 B1 * | 1/2001 | Vasic | ............................ | 375/136 |
| 6,304,545 B1 * | 10/2001 | Armbruster et al. | .......... | 370/210 |
| 6,389,066 B1 * | 5/2002 | Ejzak | ............................ | 375/224 |
| 6,438,183 B1 | 8/2002 | Taura et al. | | |
| 6,570,910 B1 * | 5/2003 | Bottomley et al. | ........... | 375/148 |
| 6,647,078 B1 * | 11/2003 | Thomas et al. | ............... | 375/349 |

(Continued)

OTHER PUBLICATIONS

M. Morelli, A. N. D'Andrea, and Mengali, "Frequency Ambiguity Resolution in OFDM Systems," IEEE Commun. Lett., vol. 4, pp. 134-136.

(Continued)

*Primary Examiner* — Tesfaldet Bocure

(57) ABSTRACT

An adaptive receiver comprises a receiver module that receives an orthogonal frequency division multiplexing (OFDM) signal. An operating parameters module monitors at least one operating parameter of the receiver module and generates a select signal based the at least one operating parameter. An estimator module selects between first and second algorithms based on the select signal and selectively estimates a carrier frequency offset (CFO) of the OFDM signal using the one of the first and second algorithms. Alternately, an estimator module adjusts algorithm operating parameters of a first algorithm based on the select signal and selectively estimates a carrier frequency offset (CFO) of the OFDM signal using the selected algorithm operating parameters of the first algorithm.

39 Claims, 21 Drawing Sheets

U.S. PATENT DOCUMENTS

| | | | |
|---|---|---|---|
| 6,802,035 B2 * | 10/2004 | Catreux et al. | 714/746 |
| 6,888,809 B1 * | 5/2005 | Foschini et al. | 370/334 |
| 6,937,671 B2 * | 8/2005 | Samarasooriya | 375/326 |
| 6,940,914 B1 * | 9/2005 | Lo et al. | 375/260 |
| 6,983,028 B2 * | 1/2006 | Ahn | 375/326 |
| 7,110,473 B2 * | 9/2006 | Miller et al. | 375/316 |
| 7,170,961 B2 * | 1/2007 | Vandenameele-Lepla | 375/371 |
| 7,173,979 B1 | 2/2007 | Badri et al. | |
| 7,173,990 B2 * | 2/2007 | Kim et al. | 375/347 |
| 7,200,185 B2 | 4/2007 | Thesling et al. | |
| 7,203,459 B2 * | 4/2007 | Goldstein et al. | 455/67.11 |
| 7,209,433 B2 * | 4/2007 | Scarpa | 370/206 |
| 7,227,917 B2 * | 6/2007 | Auranen | 375/346 |
| 7,251,273 B2 * | 7/2007 | Hwang et al. | 375/229 |
| 7,251,282 B2 * | 7/2007 | Maltsev et al. | 375/260 |
| 7,266,162 B2 * | 9/2007 | Jiang | 375/326 |
| 7,277,493 B2 | 10/2007 | Lai | |
| 7,295,517 B2 * | 11/2007 | Anim-Appiah et al. | 370/232 |
| 7,295,637 B2 * | 11/2007 | Papathanasiou et al. | 375/347 |
| 2002/0001352 A1 * | 1/2002 | Stirling-Gallacher et al. | 375/260 |
| 2002/0017948 A1 | 2/2002 | Hyakudai et al. | |
| 2002/0021715 A1 * | 2/2002 | Matheus et al. | 370/480 |
| 2002/0037058 A1 * | 3/2002 | Birru | 375/340 |
| 2002/0145971 A1 | 10/2002 | Cho et al. | |
| 2002/0146078 A1 | 10/2002 | Gorokhov et al. | |
| 2002/0147953 A1 * | 10/2002 | Catreux et al. | 714/746 |
| 2002/0159540 A1 * | 10/2002 | Chiodini | 375/316 |
| 2002/0186799 A1 | 12/2002 | Sayeed | |
| 2003/0031278 A1 * | 2/2003 | Kang et al. | 375/341 |
| 2003/0058953 A1 * | 3/2003 | Lee et al. | 375/260 |
| 2003/0072395 A1 * | 4/2003 | Jia et al. | 375/341 |
| 2003/0114164 A1 * | 6/2003 | Thomas et al. | 455/452 |
| 2003/0123582 A1 * | 7/2003 | Kim et al. | 375/347 |
| 2003/0128656 A1 * | 7/2003 | Scarpa | 370/203 |
| 2003/0128751 A1 * | 7/2003 | Vandenameele-Lepla | 375/229 |
| 2003/0133518 A1 * | 7/2003 | Koomullil et al. | 375/326 |
| 2003/0207680 A1 | 11/2003 | Yang et al. | |
| 2003/0235252 A1 * | 12/2003 | Tellado et al. | 375/259 |
| 2004/0004933 A1 | 1/2004 | Zhu et al. | |
| 2004/0008618 A1 | 1/2004 | Shirakata et al. | |
| 2004/0071234 A1 * | 4/2004 | Li | 375/341 |
| 2004/0086055 A1 * | 5/2004 | Li | 375/260 |
| 2004/0091057 A1 * | 5/2004 | Yoshida | 375/260 |
| 2004/0156441 A1 | 8/2004 | Peeters et al. | |
| 2004/0157578 A1 * | 8/2004 | Auranen | 455/278.1 |
| 2004/0190636 A1 * | 9/2004 | Oprea | 375/260 |
| 2004/0190648 A1 * | 9/2004 | Anim-Appiah et al. | 375/324 |
| 2004/0192218 A1 * | 9/2004 | Oprea | 455/73 |
| 2004/0203465 A1 * | 10/2004 | Goldstein et al. | 455/67.13 |
| 2004/0240570 A1 * | 12/2004 | Alard et al. | 375/260 |
| 2004/0259514 A1 * | 12/2004 | Nissila | 455/226.1 |
| 2005/0030886 A1 * | 2/2005 | Wu et al. | 370/206 |
| 2005/0084025 A1 | 4/2005 | Chen | |
| 2005/0100106 A1 | 5/2005 | Chen | |
| 2005/0117657 A1 * | 6/2005 | Chen | 375/260 |
| 2005/0141460 A9 | 6/2005 | Currivan et al. | |
| 2005/0175124 A1 * | 8/2005 | Goldstein et al. | 375/330 |
| 2005/0180760 A1 * | 8/2005 | Feced et al. | 398/183 |
| 2005/0265489 A1 * | 12/2005 | Chang et al. | 375/340 |
| 2006/0146962 A1 | 7/2006 | Troya et al. | |
| 2007/0133386 A1 | 6/2007 | Kim et al. | |
| 2007/0140366 A1 * | 6/2007 | Rore | 375/260 |

OTHER PUBLICATIONS

J. R. Barry, D. G. Messerschmitt, and E. A. Lee, Digital Communication, 3rd ed. Norwell:Kluwer Academic Publishers, 2003, pp. 728-738.

H. Nikookar and R. Prasad, "On the Sensitivity of Multicarrier Transmission Over Multipath Channels to Phase Noise and Frequency Offsets," in Proc. IEEE GLOBECOM'96, Nov. 1996, pp. 68-72.

W. Hwang, H. Kang, and K. Kim, "Approximation of SNR Degradation Due to Carrier Frequency Offset for OFDM in Shadowed Multipath Channels," IEEE Commun. Letters, vol. 7, Dec. 2003, pp. 581-583.

T. Rappaport, Wireless Communications. Upper Saddle River, NJ: Prentice-Hall, 1996, pp. 143-153.

K. Sathananthan and C. Tellambura, "Probability of Error Calculation of OFDM Systems with Frequency Offset, " IEEE Trans. Commun., vol. 449, Nov. 2001, pp. 1884-1888.

P. Billingsley, Probability and Measure, 3rd ed. New York: Wiley Interscience, 1995, pp. 357-370.

J.G. Proakis, Digital Communications, 4th ed. New York: McGraw-Hill, 2000, pp. 269-282.

P.H. Moose, "A Technique for Orthogonal Frequency Division Multiplexing Frequency Offset Correction," IEEE Trans. Commun., vol. 42, Oct. 1994, pp. 2908-2914.

F. Classen and H. Meyr, "Frequency Synchronization Algorithms for OFDM Systems Suitable for Communication Over Frequency Selective Fading Channels," in Proc. IEEE 44th Veh. Technol. Conf., 1994, pp. 1655-1659.

N. Lashkarian and S. Kiaei, "Class of Cyclic-based Estimators for Frequency-offset Estimation of OFDM Systems," IEEE Trans. Commun., vol. 48, Dec. 2000 pp. 2139-2149.

U.S. Patent Application Serial Number To be Assigned, filed Nov. 10, 2004, entitled, "Frequency Tracking for OFDM Transmission Over Frequency Selective Channels".

U.S. Patent Application Serial Number To be Assigned, filed Nov. 10, 2004, entitled, "Adaptive OFDM Transmitter Based on Carier Frequency Offset".

U.S. Patent Application Serial Number To be Assigned, filed Nov. 10,2004, entitled, "Carrier Frequency Offset Estimation for OFDM Systems".

Goldsmith et al. "Adaptive Coded Modulation for Fading Channels," IEEE Transactions on Communications, vol. 46, No. 5, May 1998, pp. 595-602.

Goldsmith et al. "Variable-Rate Variable-Power MQAM for Fading Channels," IEEE Transactions on Communications, vol. 45, No. 10, Oct. 1997, pp. 1218-1230.

Tang et al. "Effect of Channel Estimation Error on M-QAM BER Performance in Rayleigh Fading," IEEE Transactions on Communications, vol. 47, No. 12, Dec. 1999, pp. 1856-1864.

Van de Beek et al. "ML Estimation of Time and Frequency Offset in OFDM Systems," IEEE Transactions on Signal Processing, vol. 45, No. 7, Jul. 1997, pp. 1880-1805.

J.A.C. Bingham, "Multicarrier Modulation for Data Transmission: An Idea Who's Time Has Come," IEEE Commun. Mag., vol. 28, May 1990, pp. 5-14.

R. Need and R. Prasad, "OFDM for Wireless Multimedia Communications" Norwell, MA: Artech House, 2000.

W. Zhou and Y. Wu, "COFDM: An Overview," IEEE Trans. Broadcast, vol. 41, Mar. 1995, pp. 1-8.

T. Pollet, M. Van Bladel, and M. Moeneclaey, "BER Sensitivity of OFDM Systems to Carrier Frequency Offset and Wiener Phase Noise," IEEE Trans. Commun., vol. 43, Feb./Mar./Apr. 1995, pp. 191-193.

T. Schmidl and D.C. Cox, "Robust Frequency and Timing Synchronization for OFDM," IEEE Trans. Commun., vol. 45, Dec. 1997, 1613-1621.

* cited by examiner

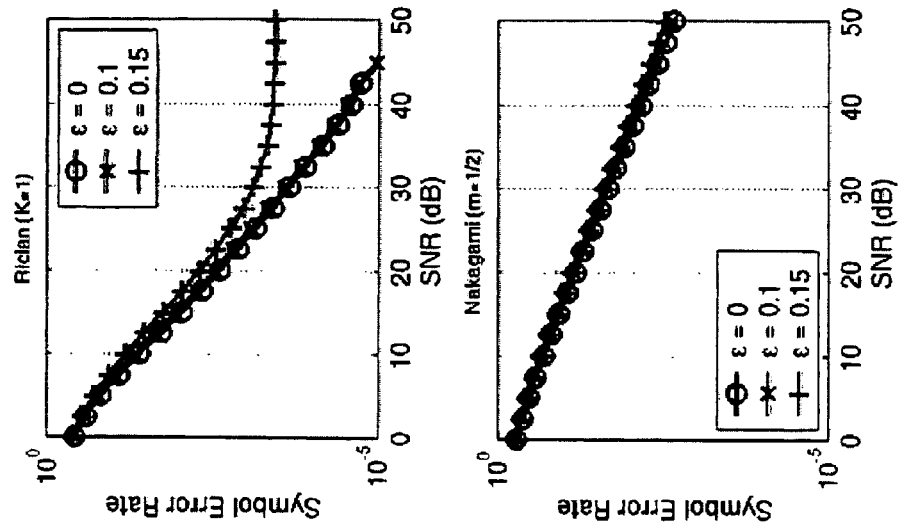
FIG. 9B
FIG. 9A
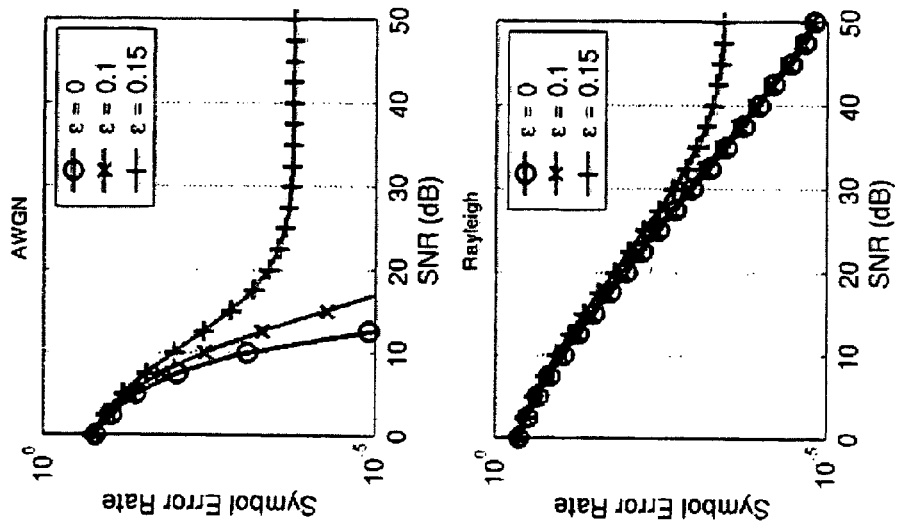
FIG. 9D
FIG. 9C

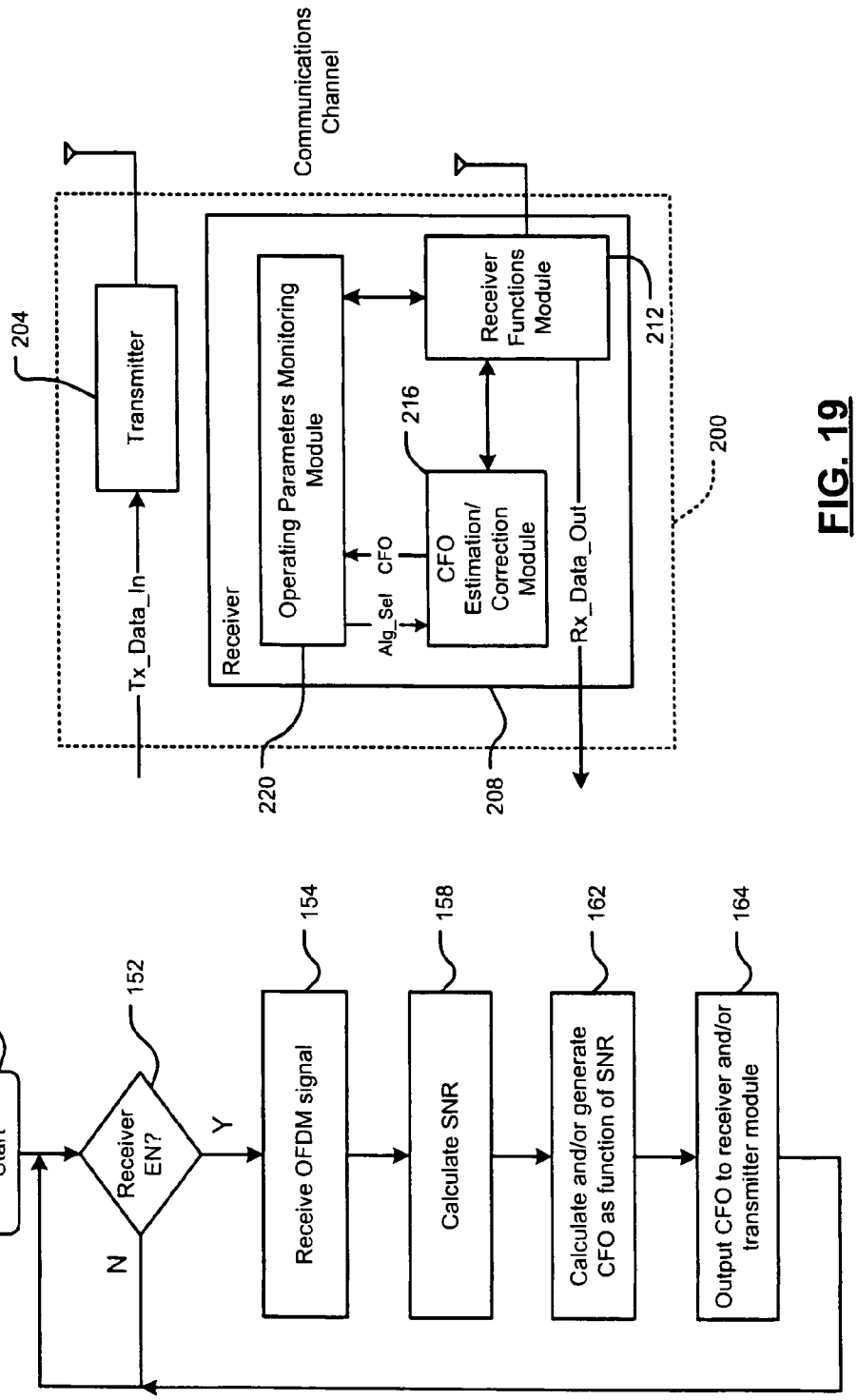

US 8,311,152 B1

ADAPTIVE OFDM RECEIVER BASED ON CARRIER FREQUENCY OFFSET

CROSS-REFERENCE TO RELATED APPLICATIONS

This application claims the benefit of U.S. Provisional Application Nos. 60/548,205 filed on Feb. 27, 2004, 60/557,327 filed on Mar. 29, 2004, 60/548,206 filed on Feb. 27, 2004, 60/550,676 filed on Mar. 5, 2004, 60/585,651 filed on Jul. 6, 2004, 60/568,555, filed on May 6, 2004, and 60/568,713 filed on May 6, 2004. This application is related to Ser. No. 10/986,082 filed on Nov. 10, 2004 and Ser. No. 10/986,130 filed on Nov. 10, 2004. The disclosures of the above applications are incorporated herein by reference.

FIELD OF THE INVENTION

The present invention relates to communications systems, and more particularly to communications systems employing orthogonal frequency division multiplexing (OFDM) transceivers.

BACKGROUND OF THE INVENTION

Referring now to FIG. 1, a system 10 comprises a plurality of transceivers 12-1, 12-2, ..., and 12-N (collectively transceivers 12). The transceivers 12-1, 12-2, ..., and 12-N include transmitters 14-1, 14-2, ..., and 14-N (collectively transmitters 14) and receivers 16-1, 16-2, ..., and 16-N (collectively receivers 16) that transmit/receive signals over a communications channel, respectively. In wireless applications, the transmitters 14 and receivers 16 transmit/receive signals via an antenna and/or an array of antennas 20-1, 20-2, ..., 20-N (collectively antennas 20). Signals output by the transmitters 14 travel through various paths (or multipaths) having different lengths before arriving at the receivers 16.

Since multiple versions of the signal may arrive at different times and interfere with each other (commonly called inter symbol interference (ISI)), it becomes very difficult to extract the original data. In other words, when the communications system 10 transmits data at time intervals T and has a longest delay $\tau_{max}$ with respect to the earliest path, a received symbol can be influenced by $\tau_{max}/T$ prior symbols. To operate properly, the receiver 16 should compensate for the influence of ISI.

To reduce the number of prior symbols that can have impact on the current symbol, the original data stream may be multiplexed into N parallel data streams, each of which is modulated by a different frequency. The N parallel signals are transmitted. In effect, the time interval T is reduced by 1/N. Therefore, the number of prior symbols that influence the current symbol is reduced by 1/N, which makes compensation for ISI easier.

Orthogonal frequency division multiplexing (OFDM) systems were developed to address multi-path, ISI and other problems. OFDM systems are used for high-speed communications through frequency selective channels. OFDM systems remove the inter-symbol interference (ISI) and are usually implemented using computationally efficient fast Fourier transform (FFT) techniques. Because of these advantages, OFDM is often used in wireless and wired communication systems such as wireless LAN (IEEE 802.11a and HIPERLAN/2), digital audio broadcasting (DAB), terrestrial digital video broadcasting (DVB-T), asymmetric digital subscriber line (ADSL), and very high-speed digital subscriber line (VDSL) systems.

Although OFDM has many advantages, OFDM is susceptible to carrier frequency offset (CFO), which may occur due to Doppler shift and/or from the mismatch between the oscillator frequencies of the transmitter 14 of one device and the receiver 16 of another device. The CFO attenuates the desired signal and introduces inter-carrier interference (ICI). As a result, the signal-to-noise ratio (SNR) decreases and consequently the performance of a OFDM system degrades. To overcome the adverse effects of the CFO, various carrier frequency synchronization methods have been developed. Since these synchronization methods cannot remove the CFO completely, the effect of a residual CFO must be accommodated.

In some systems, the SNR degradation due to the CFO is estimated for additive white Gaussian noise (AWGN) channels, time-invariant multipath channels and shadowed multipath channels. However, the SNR expressions are typically complex and only approximate the SNR. In other approaches, the effect of the CFO on the symbol error rate (SER) has been developed. However, the SER expression is complex and valid only for the AWGN channel.

Similar to single-carrier systems, differential demodulation in OFDM systems eliminates the need for channel estimation, which reduces the complexity of the receiver and training overhead as compared to coherent demodulation. However, these advantages are accompanied by approximately 3 dB degradation in signal-to-noise ratio (SNR).

Differential encoding can be done in the time-domain or the frequency-domain. The time-domain approach encodes a symbol differentially over two consecutive OFDM symbols at the same subcarrier. The frequency-domain approach encodes a symbol differentially over two adjacent subcarriers of the same OFDM symbol. Time-domain differential demodulation performs well when the channel changes slowly over time so that the channel phase of two consecutive OFDM symbols is about the same. On the other hand, frequency-domain differential demodulation is a good choice when the multipath spread is small compared to the length of one OFDM symbol so that the channel phase between two adjacent subcarriers in the same OFDM symbol is about the same.

Although there has been research relating to the effect of the multipath and Doppler spread on differential demodulation, little is known about the effect of the CFO. The receiver carrier frequency should be synchronized with that of the transmitter to avoid performance degradation. A differential demodulation receiver, however, does not need to track the transmitter carrier phase.

SUMMARY OF THE INVENTION

An adaptive receiver according to some implementations comprises a receiver module that receives an orthogonal frequency division multiplexing (OFDM) signal. An operating parameters module monitors at least one operating parameter of the receiver module and generates a select signal based the at least one operating parameter. An estimator module selects between first and second algorithms based on the select signal and selectively estimates a carrier frequency offset (CFO) of the OFDM signal using the one of the first and second algorithms.

In some implementations, the at least one operating parameter includes at least one of signal to noise ratio (SNR), symbol error rate (SER), bit error rate (BER), coding rate, and modulation type. The operating parameters module selects between the first and second algorithms to minimize power consumption, delay and/or complexity.

In some implementations, the receiver module performs coherent demodulation, frequency differential demodulation, or time differential demodulation. The receiver module is a wireless or wired receiver. The estimator module corrects the CFO in the OFDM signal.

An adaptive receiver comprises a receiver module that receives an orthogonal frequency division multiplexing (OFDM) signal. An operating parameters module monitors at least one operating parameter of the receiver module and generates a select signal based the at least one operating parameter. An estimator module adjusts algorithm operating parameters of a first algorithm based on the select signal and selectively estimates a carrier frequency offset (CFO) of the OFDM signal using the selected operating parameters of the first algorithm.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 4:
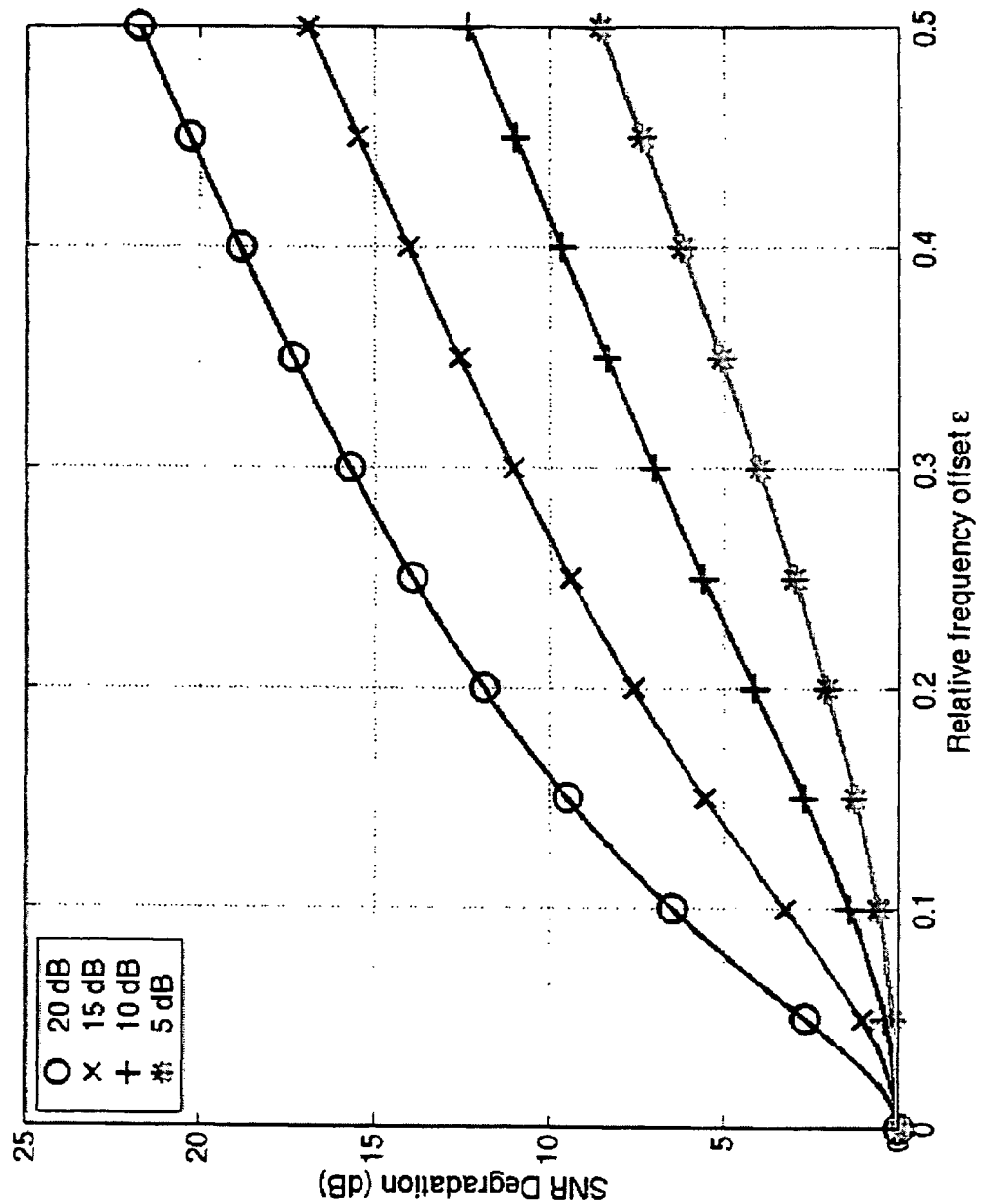

10 dB, and 0 dB;

FIG. 4 illustrates SNR degradation with $$\frac{P_h \sigma_X^2}{\sigma_Z^2} = 5 \text{ dB},$$

Figure 5:
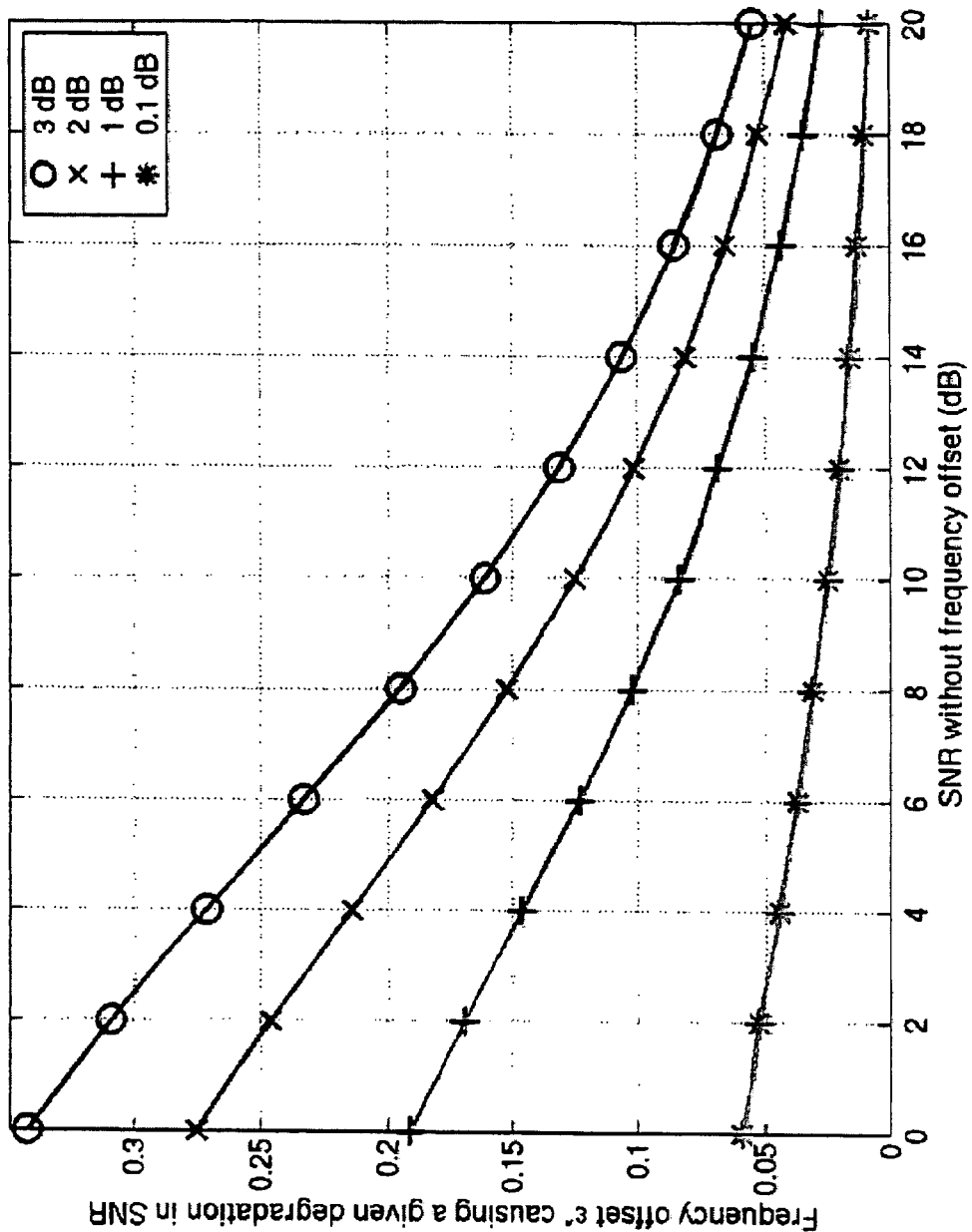
Figure 6:
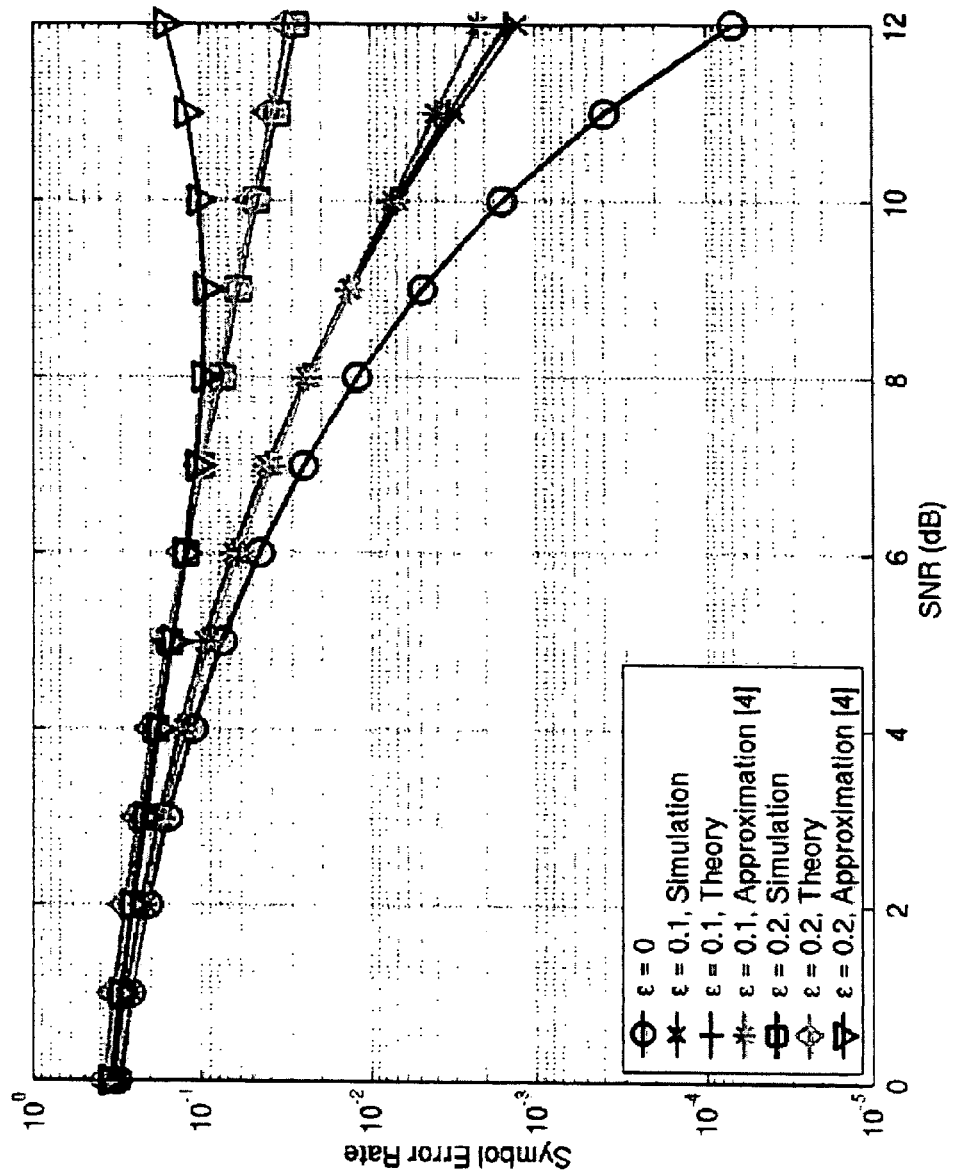
Figure 7:
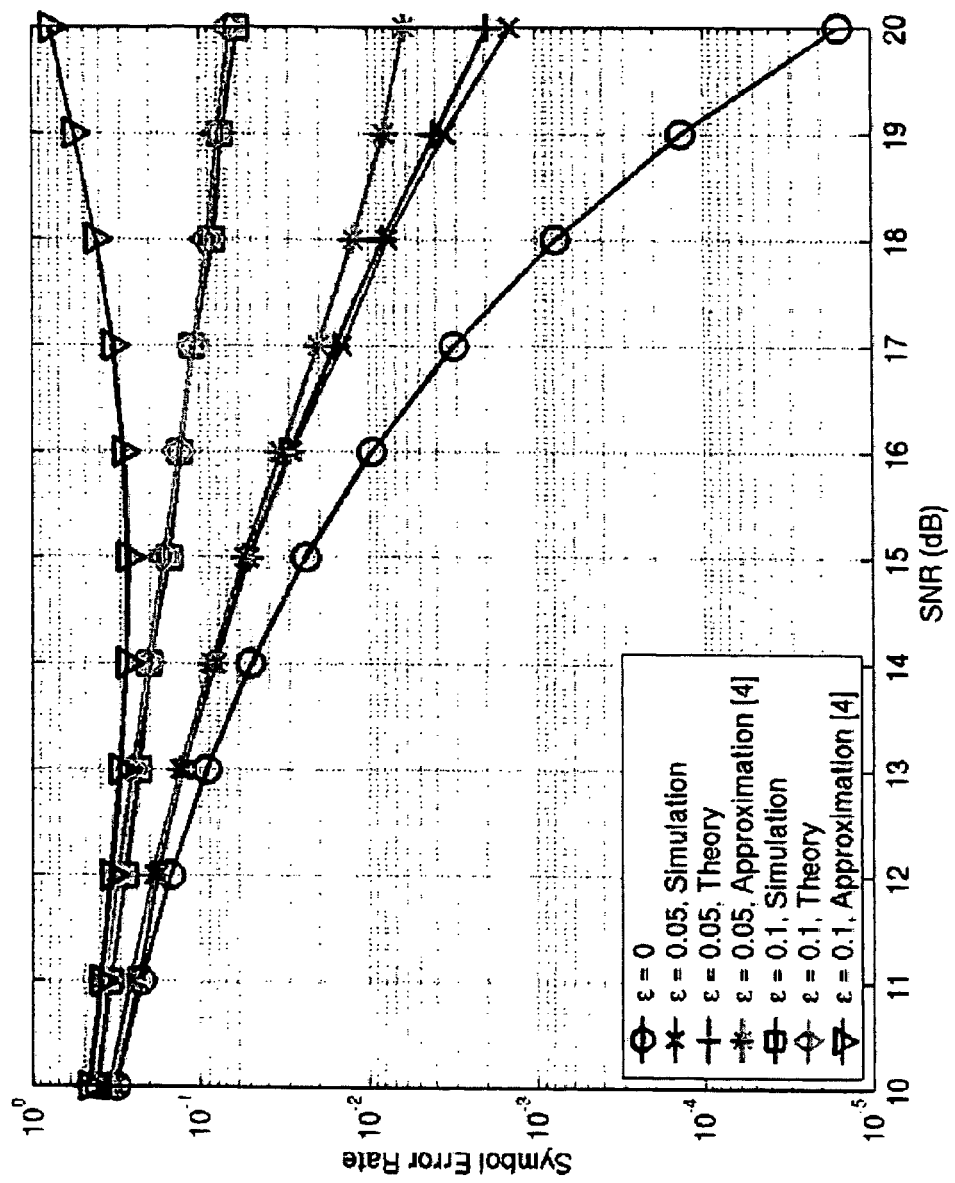
Figure 8:
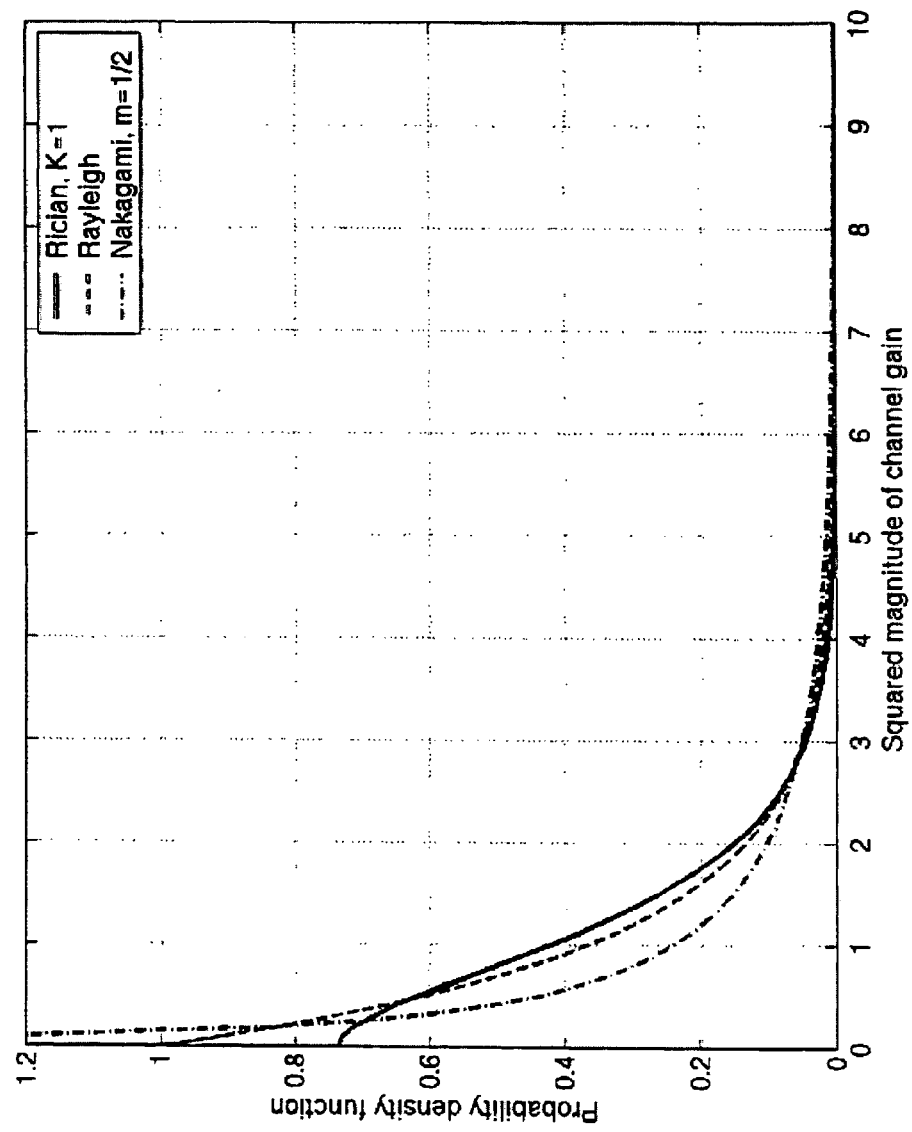
Figure 10:
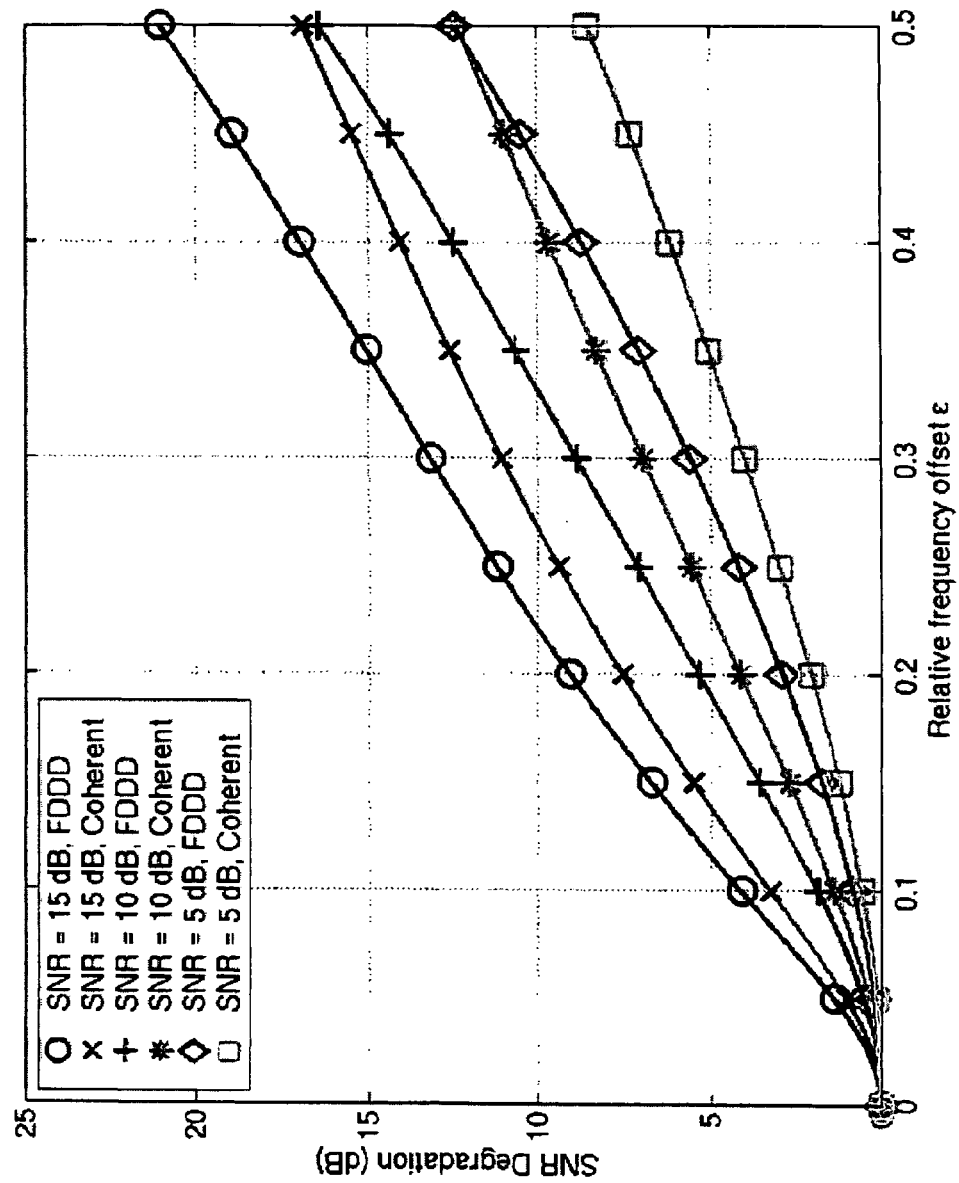
Figure 11:
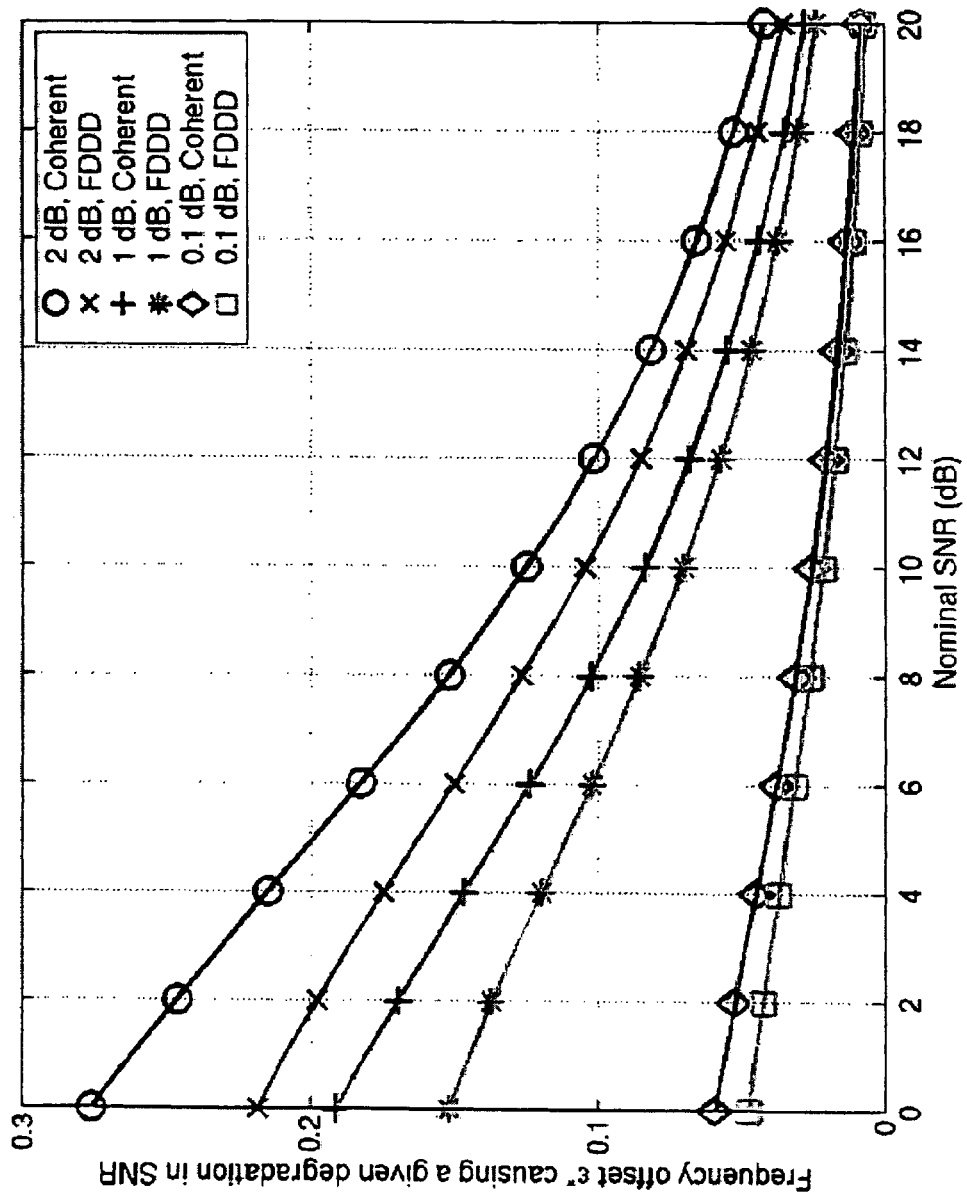
Figure 12:
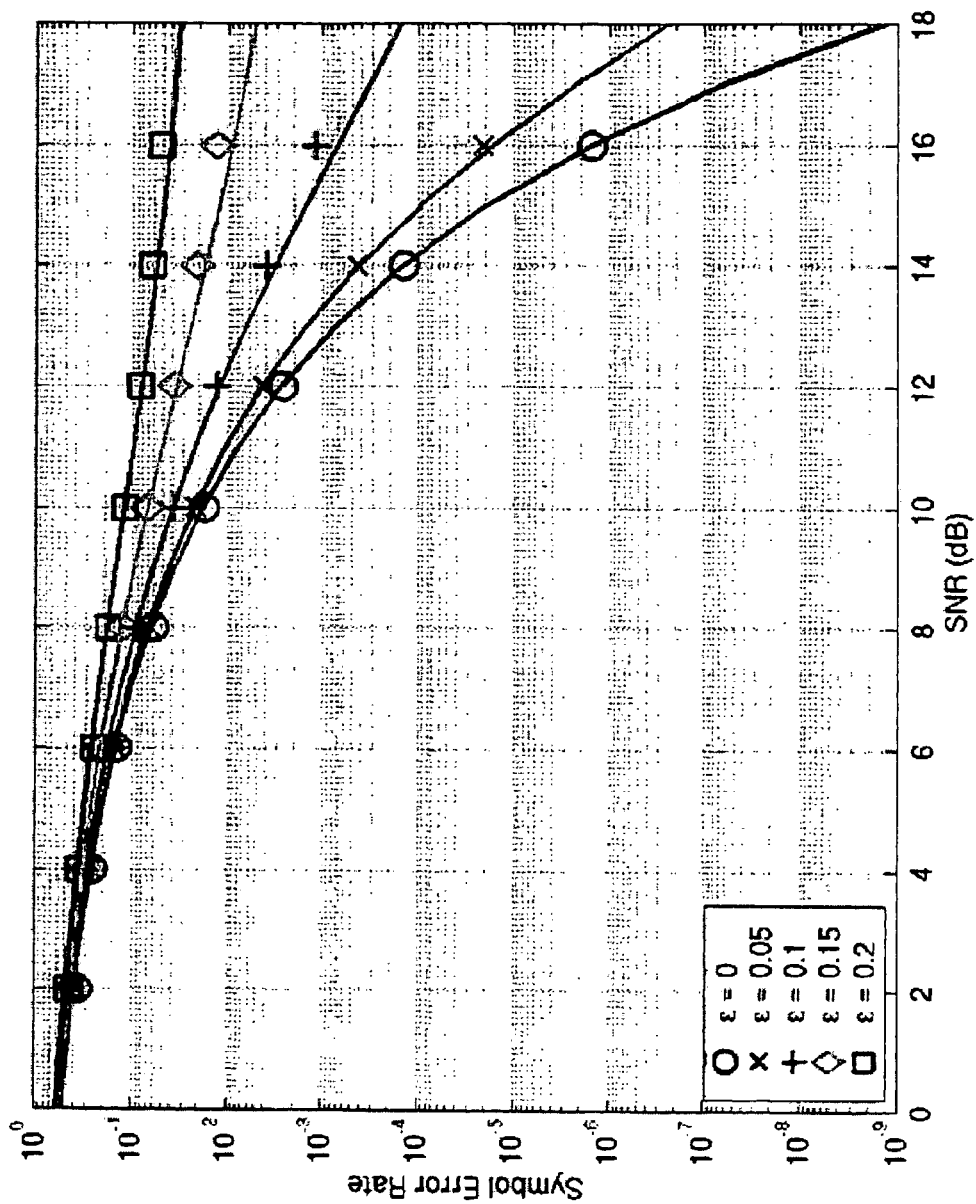
Figure 13:
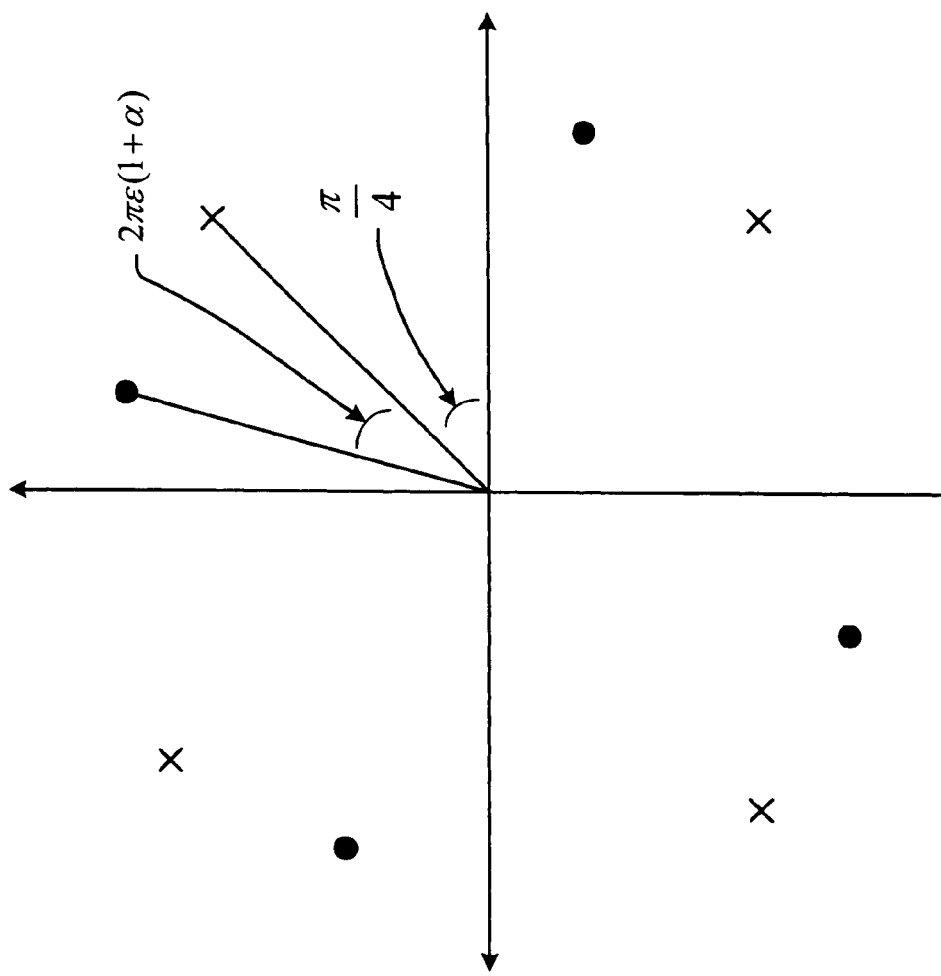
Figure 14:
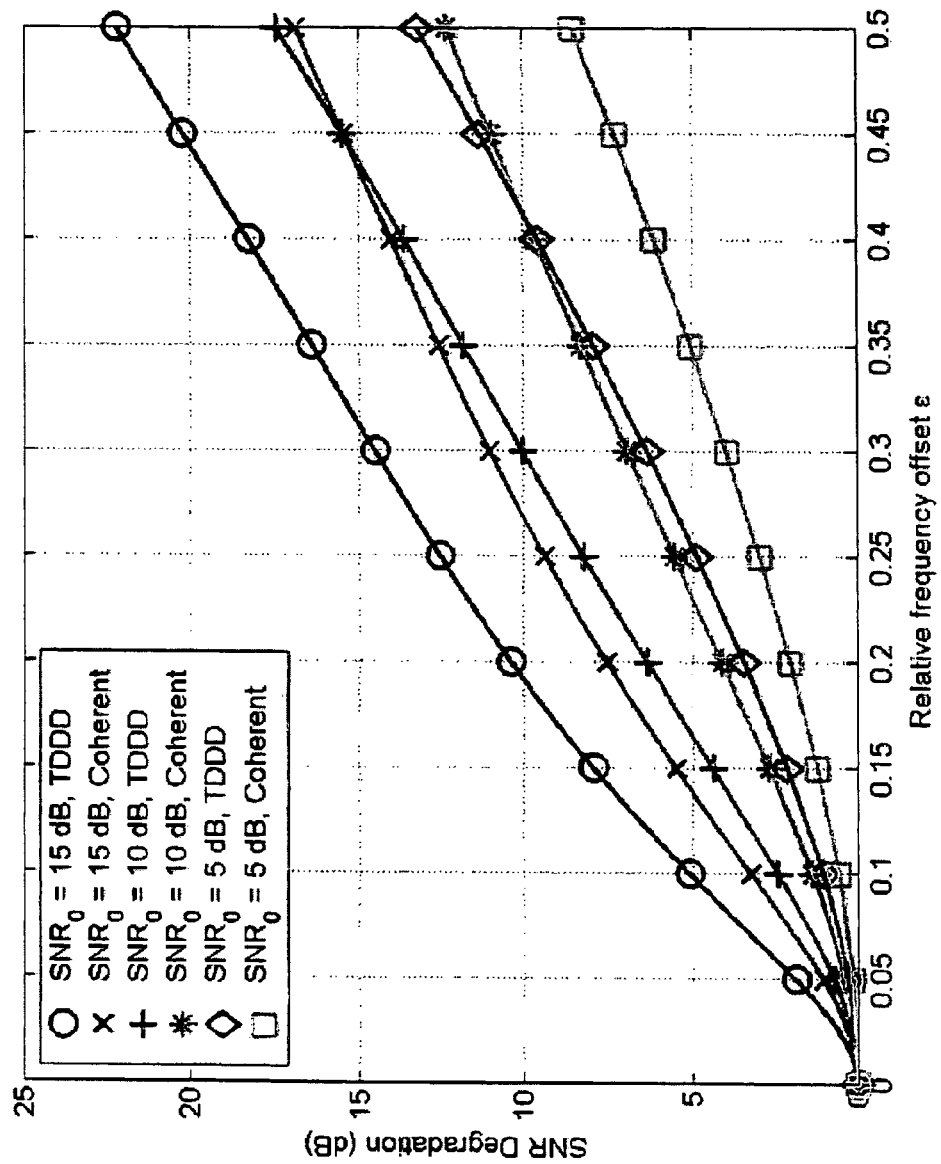
Figure 15:
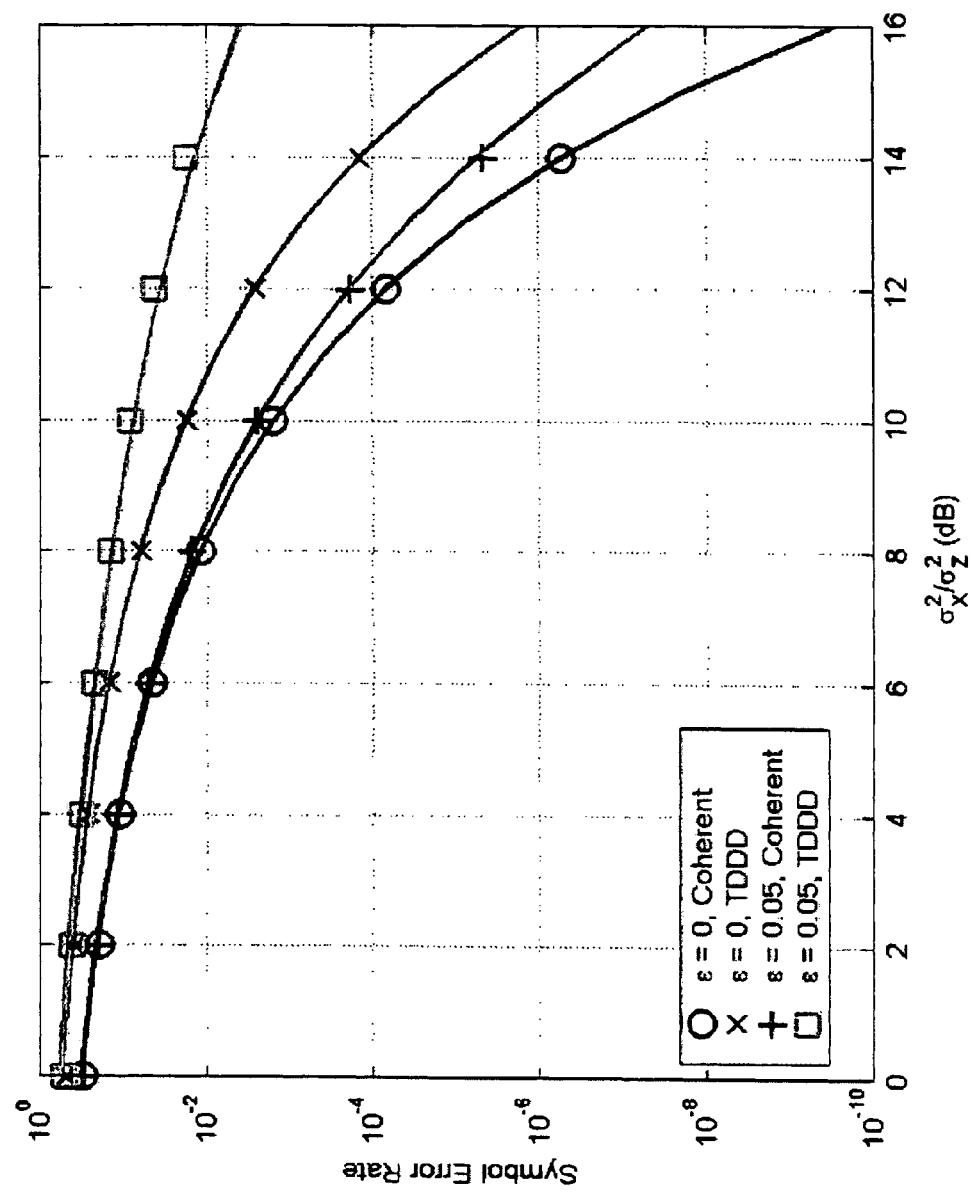
Figure 16:
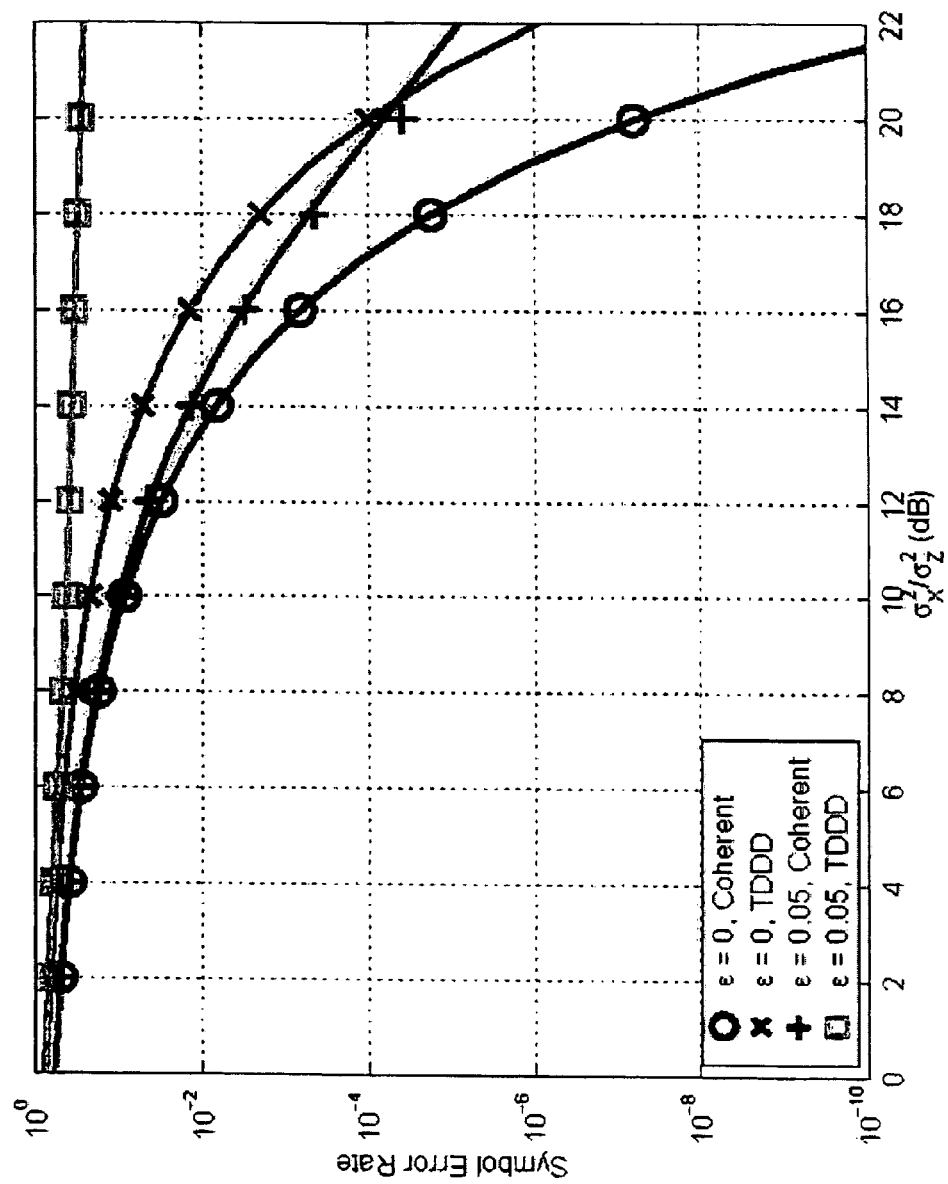
Figure 17:
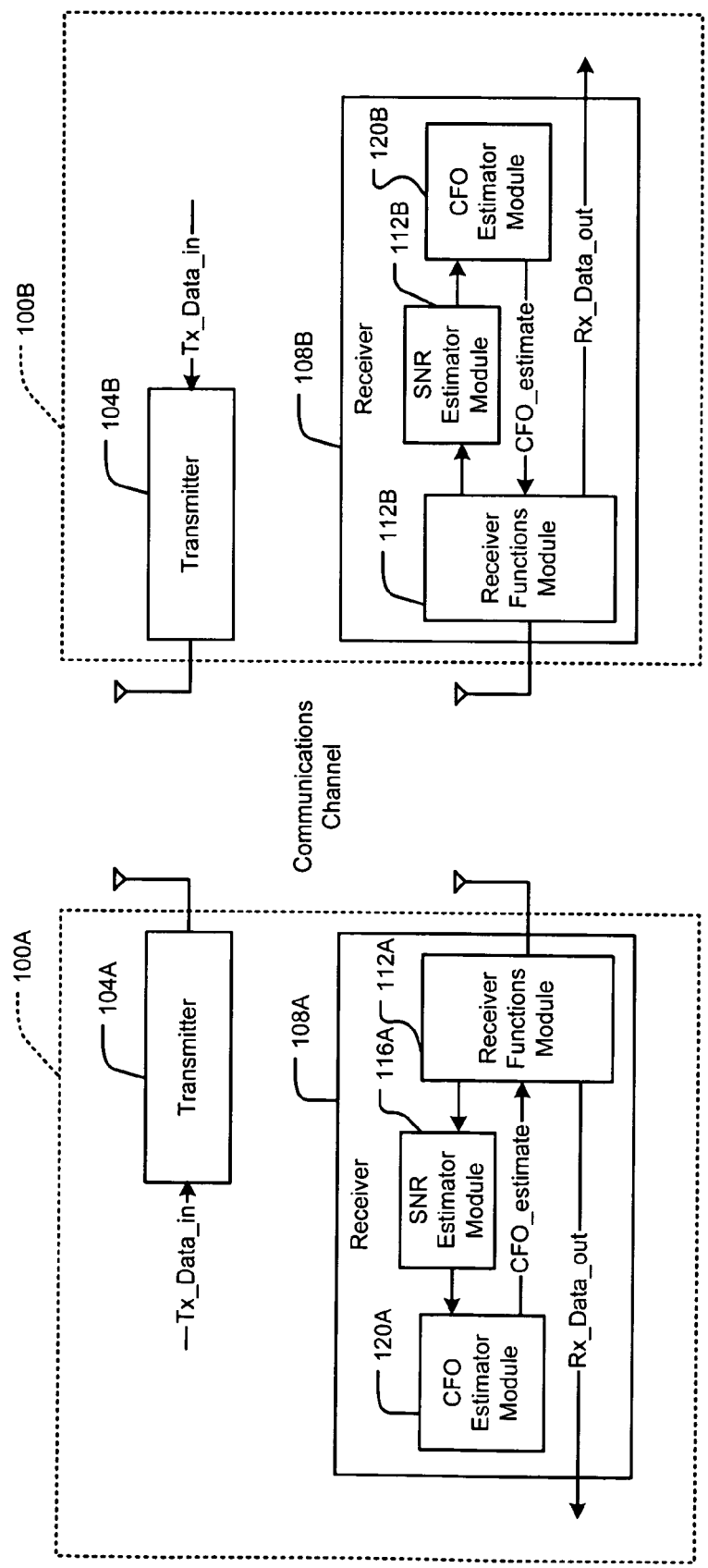
Figure 20:
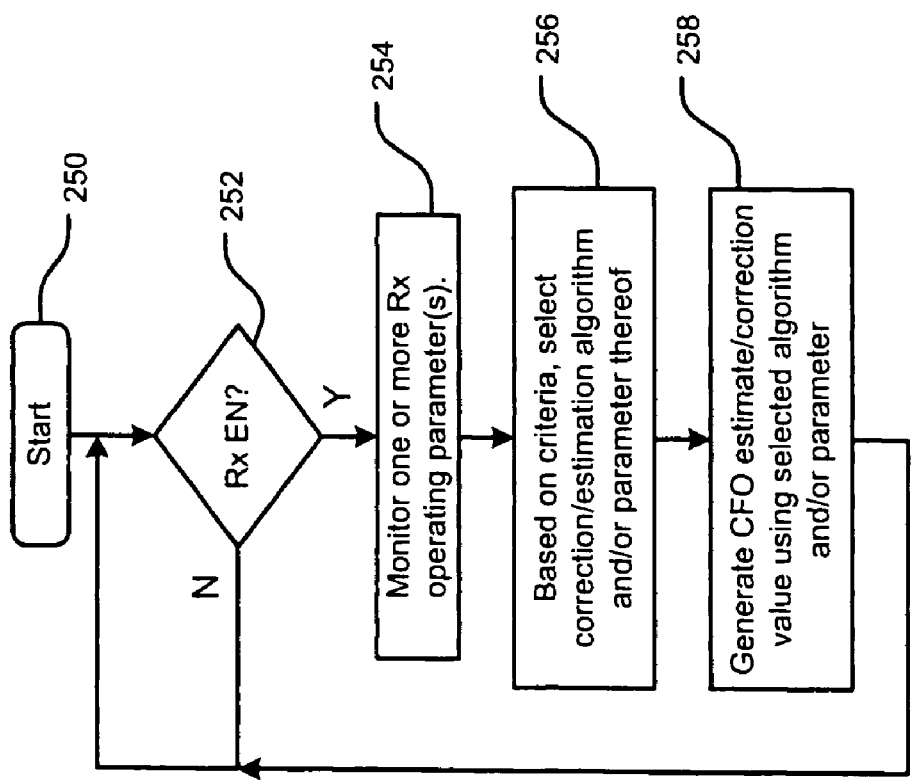
Figure 21:
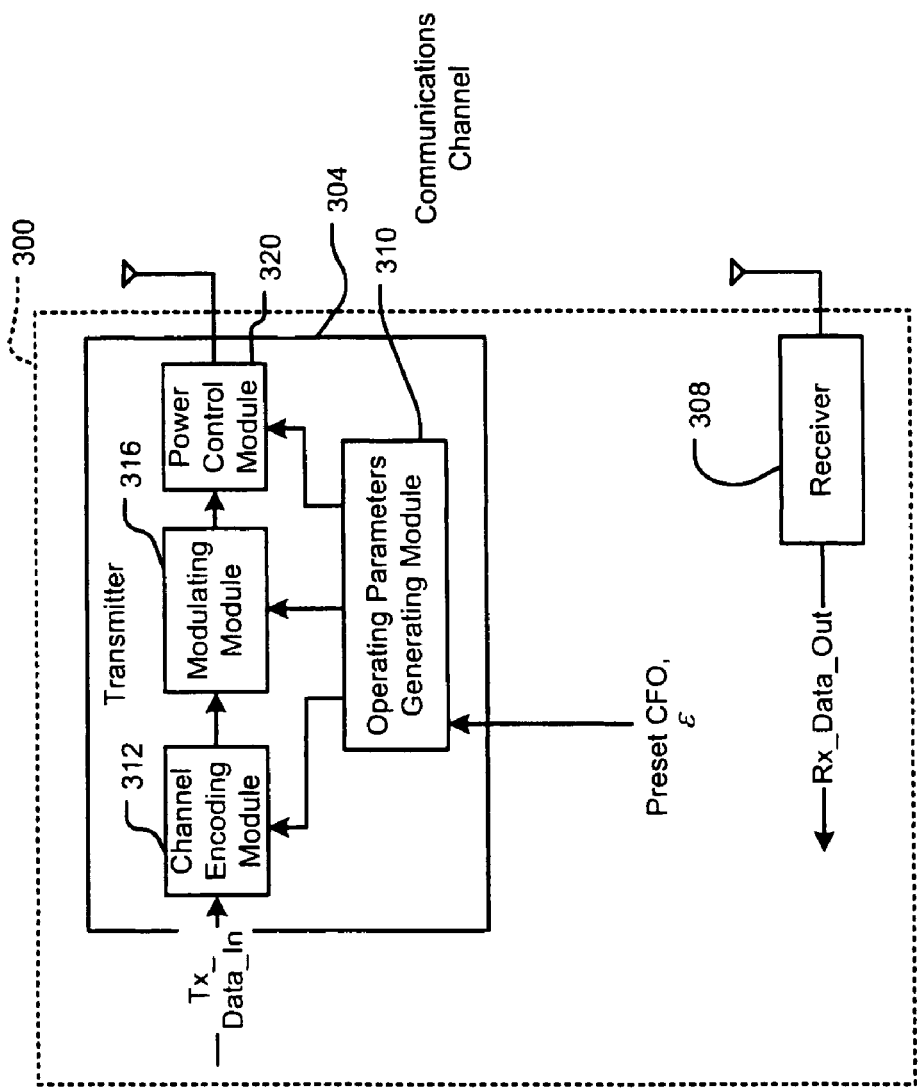
Figure 22:
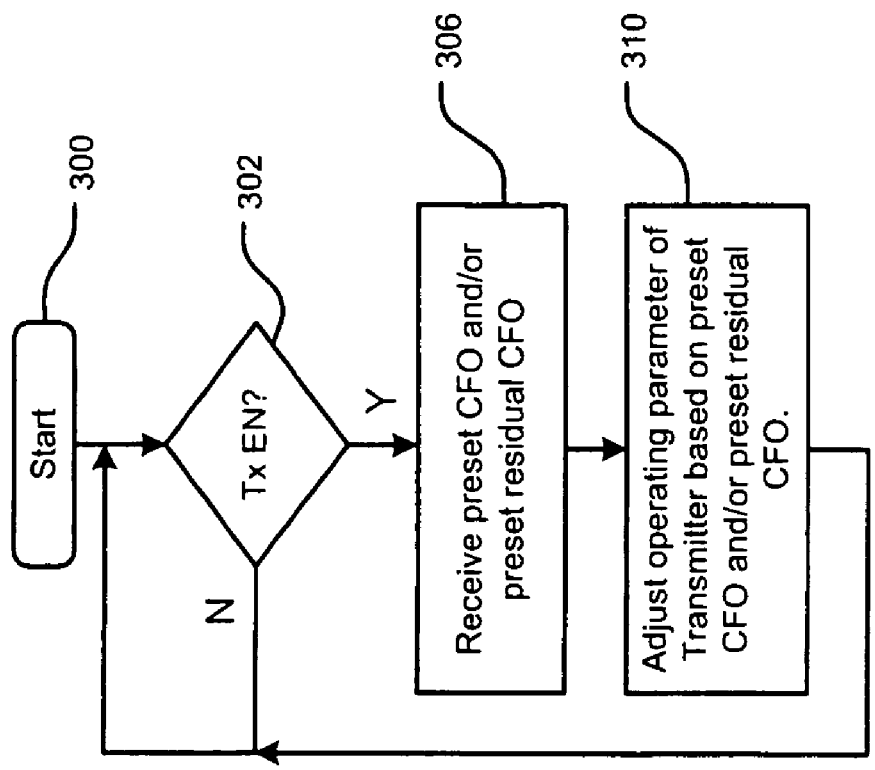

10 dB, 15 dB, and 20 dB for AWGN and coherent OFDM channels;

FIG. 5 illustrates the frequency offsets that cause 3 dB, 2 dB, 1 dB, and 0.1 dB degradation in SNR for AWGN and coherent OFDM channels;

FIG. 6 illustrates symbol error rate (SER) for QPSK in AWGN channels in the absence and the presence of CFO for AWGN and coherent OFDM channels;

FIG. 7 illustrates SER for 16 QAM in AWGN channels in the absence and the presence of CFO for AWGN and coherent OFDM channels;

FIG. 8 illustrates the probability density function of the magnitude square of the channel gain;

FIGS. 9A-9D illustrate Symbol Error Rate (SER) for various fading coherent OFDM channels;

FIG. 10 illustrates SNR degradation of coherent demodulation and frequency-domain differential demodulation (FDDD) due to the frequency offset for AWGN channels;

FIG. 11 illustrates frequency offset that causes 2 dB, 1 dB, and 0.1 dB SNR degradation for AWGN channels;

FIG. 12 illustrates SER for FDDD;

FIG. 13 is a graph that illustrates rotation of signal constellation points;

FIG. 14 is a graph illustrating SNR degradation of time-domain differential demodulation (TDDD) and coherent demodulation due to frequency offset for AWGN channels;

FIG. 15 is a graph illustrating symbol error rate (SER) of coherent demodulation with QPSK and TDDD with four-phase DPSK for AWGN channels;

FIG. 16 illustrates SER of coherent demodulation with 8PSK and TDDD with eight phase DPSK for AWGN channels;

FIG. 17 is a functional block diagram of an OFDM transceiver having a receiver that estimates SNR and generates a CFO estimate based thereon;

FIG. 18 is a flowchart illustrating steps performed by the system in FIG. 17;

FIG. 19 is a functional block diagram of an adaptive receiver that adjusts a CFO estimation/correction algorithm in an adaptive manner;

FIG. 20 is a flowchart illustrating steps performed by the adaptive receiver in FIG. 19;

FIG. 21 is a functional block diagram of an adaptive transmitter that adjusts an operating parameter based on the CFO; and FIG. 22 is a flowchart illustrating steps performed by the adaptive transmitter in FIG. 21.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In the following Sections 1, 2 and 3, the effect of the carrier frequency offset on the SNR and the SER for coherent demodulation, frequency-domain differential demodulation and time-domain differential demodulation respectively, are described. A concise yet exact SNR formula is derived for each type of demodulation. The SNR formula is exact for any value of the carrier frequency offset (CFO) and nominal SNR. The relationship between the SNR degradation and various system parameters in the presence of CFO is described. Simple yet accurate SER formulas are also derived and are numerically evaluated. In Section 4, the relationships between SNR and CFO are employed in a receiver. In Sections 5 and 6, the relationships are used in adaptive receivers and adaptive transmitters, respectively.

For purposes of simplicity, each of the Sections 1-6 refer to equations using parenthesis. In the description corresponding to each Section, the equation numbers will start with (1). When referring to an equation from another Section, the equation number will be preceded or followed by a section designation. When referring to an equation from the same section, the section number will not be identified.

Section 1

Effect of CFO on Coherent Demodulation in OFDM Systems

This section analyzes the effect of the CFO on the SNR and the SER for AWGN channels, time-invariant frequency-selective channels, and multipath fading channels. A concise yet exact SNR formula is derived for each type of channel. The SNR formula is exact for any value of the CFO and nominal SNR. Simple yet accurate SER formulas are also derived and are numerically evaluated.

Figure 2:
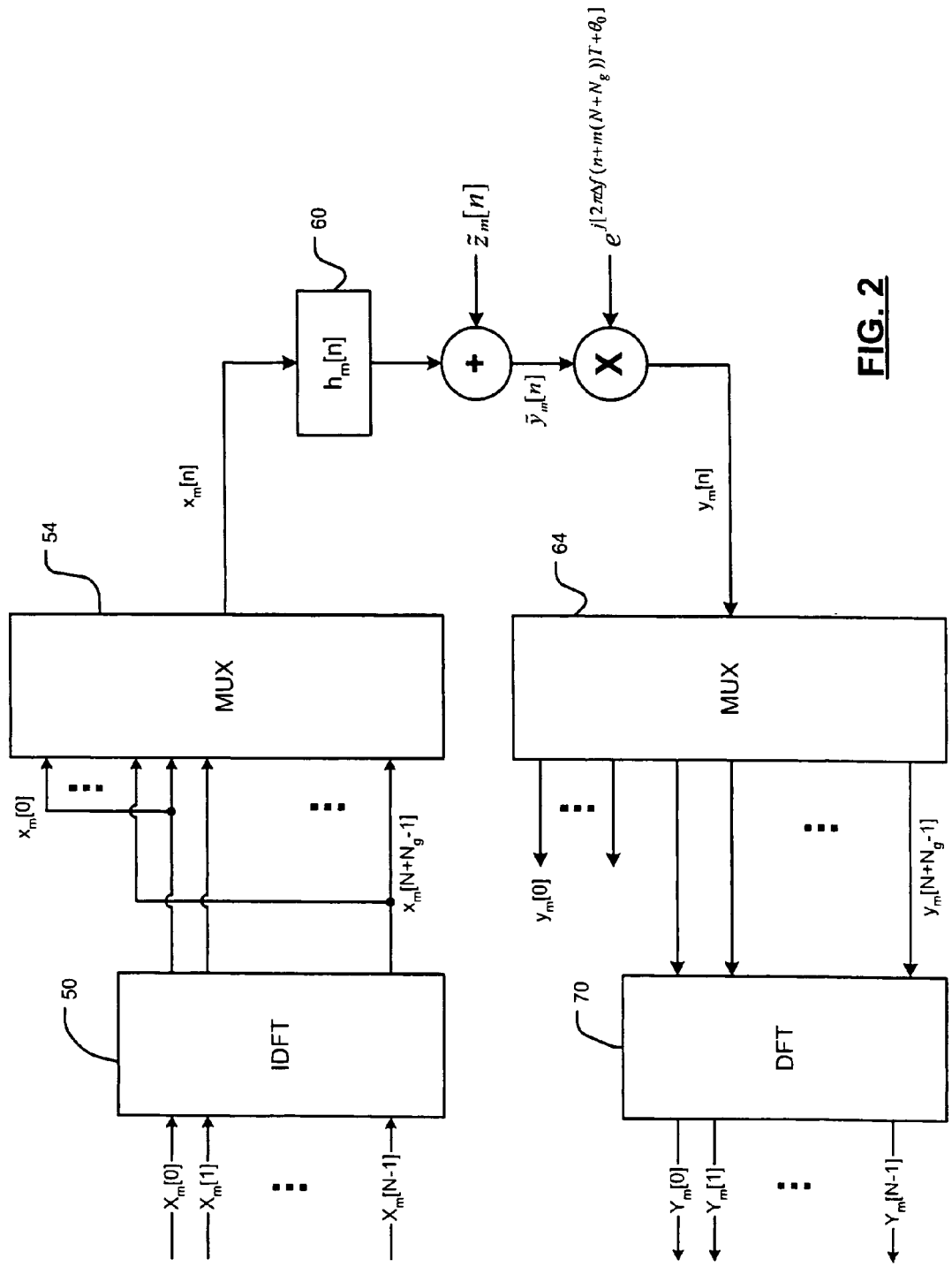
FIG. 2 is a functional block diagram of a baseband equivalent model of an OFDM system.

Referring now to FIG. 2, an OFDM system transmits information as a series of OFDM symbols. As is shown in the baseband equivalent model of an OFDM system in FIG. 2, an inverse discrete Fourier transform (IDFT) 50 is performed on transmit symbols $X_m[k]$, $k=0,1,\ldots,N-1$, to produce the time-domain samples $x_m[n]$ of the m-th OFDM symbol:

$$x_m[n] = \begin{cases} \dfrac{1}{N}\sum_{k=0}^{N-1} X_m[k]e^{j2\pi k(n-N_g)/N}, & \text{if } 0 \leq n \leq N+N_g-1 \\ 0, & \text{otherwise,} \end{cases} \quad (1)$$

where N and $N_g$ are the numbers of data samples and cyclic prefix samples, respectively. It is assumed that the transmit symbols $X_m[k]$ are zero-mean, which is true for many modulation schemes such as M-ary quadrature amplitude modulation (MQAM) and M-ary phase shift keying (MPSK). Outputs of the IDFT 50 are multiplexed by multiplexer 54.

The OFDM symbol $x_m[n]$ is transmitted through a channel $h_m[n]$ 60 and is affected by additive zero-mean Gaussian noise $\tilde{z}_m[n]$. The channel $h_m[n]$ is assumed to be block-stationary, i.e., time-invariant over each OFDM symbol. With this assumption, the output $\tilde{y}_m[n]$ of the channel can be represented as follows:

$$\tilde{y}_m[n] = h_m[n] * x_m[n] + \tilde{z}_m[n], \quad (2)$$

where * is the convolution operator, i.e., $$h_m[n] * x_m[n] = \sum_{r=-\infty}^{\infty} h_m[r]x_m[n-r],$$

and $\tilde{z}_m[n]$ is white Gaussian noise with variance $\sigma_{\tilde{z}}^2$.

Since the channel $h_m[n]$ in (2) is assumed to be block-stationary, the channel response does not change in each OFDM symbol. However, the channel response $h_m[n]$ can change over different OFDM symbols, so it is a function of the OFDM symbol index m. It is further assumed that the channel response $h_m[n]$ at time n is uncorrelated with the response $h_m[p]$ at time $p \neq n$:

$$E[h_m[n]h^*_m[p]] = \delta[n-p]E[|h_m[n]|^2]. \quad (3)$$

This channel model is valid in many practical cases and includes the shadowed multipath channel as a special case.

When the oscillator of the receiver is not perfectly matched to that of the transmitter, there can be CFO or $\Delta f = f_t - f_r$ between the transmitter carrier frequency $f_t$ and the receiver carrier frequency $f_r$. In addition, there may also be a phase offset $\theta_0$ between the transmitter carrier and the receiver carrier. The received symbol $y_m[n]$ is then:

$$y_m[n] = e^{j[2\pi\Delta f(n+m(N+N_g))T+\theta_0]}(h_m[n] * x_m[n] + \tilde{z}_m[n]), \quad (4)$$

where T is the sampling period.

The received symbols are demultiplexed by multiplexer 64 and output to DFT 70. The frequency offset $\Delta f$ can be represented with respect to the subcarrier bandwidth 1/NT by defining the relative frequency offset $\epsilon$ as:

$$\varepsilon \triangleq \frac{\Delta f}{1/NT} = \Delta f NT \quad (5)$$

Using the relative frequency offset $\epsilon$, the received sample $y_m[n]$ is expressed as:

$$y_m[n] = e^{j\frac{2\pi\varepsilon n}{N}} e^{j2\pi\varepsilon m(1+\alpha)} e^{j\theta_0}(h_m[n] * x_m[n]) + z_m[n], \quad (6)$$

where $$\alpha = \frac{N_g}{N}$$

and $$z_m[n] = e^{j\frac{2\pi\varepsilon n}{N}} e^{j2\pi\varepsilon m(1+\alpha)} e^{j\theta_0}\tilde{z}_m[n].$$

The noise $z_m[n]$ is a zero-mean complex Gaussian random variable with variance $\sigma_z^2 = \sigma_{\tilde{z}}^2$ and is independent of the transmit signal and the channel. To simplify the notation, $c_m(\epsilon,n)$ is defined as:

$$c_m(\varepsilon, n) \triangleq \frac{1}{N} e^{j2\pi\varepsilon n/N} e^{j2\pi\varepsilon m(1+\alpha)} e^{j\theta_0}. \quad (7)$$

The received sample $y_m[n]$ is then:

$$y_m[n] = Nc_m(\varepsilon,n)(h_m[n] * x_m[n]) + z_m[n]. \quad (8)$$

The relative frequency offset $\epsilon$ of (5) can be divided into an integer part l and a non-integer part $\tilde{\epsilon}$ such that $-\frac{1}{2} \leq \tilde{\epsilon} < \frac{1}{2}$:

$$\varepsilon = l + \tilde{\varepsilon}. \quad (9)$$

The effect of the integer frequency offset l and the non-integer frequency offset $\tilde{\epsilon}$ are described below.

The discrete Fourier transform (DFT) of $y_m[n]$ is equal to:

$$Y_m[k] = C_m(\varepsilon,k) * (H_m[k]X_m[k]) + Z_m[k] \quad (10)$$

where $C_m(\epsilon,k)$, $H_m[k]$, and $Z_m[k]$ are the DFTs of $c_m(\epsilon,n)$, $h_m[n]$, and $z_m[n]$, respectively. The DFT of $c_m(\epsilon,n)$ and $c_m(\epsilon,k)$ can be expressed as $$C_m(\varepsilon, k) = \quad (11)$$

$$\sum_{n=0}^{N-1} c_m(\varepsilon,n)e^{-j2\pi nk/N} = \left(\frac{1}{N}\sum_{n=0}^{N-1} e^{j2\pi(\varepsilon-k)n/N}\right)e^{j[2\pi\varepsilon m(1+\alpha)+\theta_0]} =$$

$$\left(\frac{1}{N}\frac{1-e^{j2\pi(\varepsilon-k)}}{1-e^{j2\pi(\varepsilon-k)/N}}\right)e^{j[2\pi\varepsilon m(1+\alpha)+\theta_0]} =$$

$$\left(\frac{\sin(\pi(\varepsilon-k))}{N\sin(\pi(\varepsilon-k)/N)}e^{j\pi(\varepsilon-k)(1-1/N)}\right)e^{j[2\pi\varepsilon m(1+\alpha)+\theta_0]},$$

and the magnitude of $C_m(\epsilon,k)$ is always less than or equal to 1 since $$|C_m(\varepsilon, k)| = \left|\sum_{n=0}^{N-1} c_m(\varepsilon, n)e^{-j2\pi nk/N}\right| \leq \sum_{n=0}^{N-1} |c_m(\varepsilon, n)e^{-j2\pi nk/N}| \stackrel{(\alpha)}{=} \sum_{n=0}^{N-1} \frac{1}{N} = 1 \qquad (12)$$

where the equality ($\alpha$) follows from (7).

Assuming that $H_m[k]$ and $X_m[k]$ are periodic with period N, the received symbol at the (k+l)-th subcarrier is equal to $$Y_m[k+l] = \qquad (13)$$
$$C_m(\varepsilon, l)H_m[k]X_m[k] + \sum_{r=1}^{N-1} C_m(\varepsilon, r+l)H_m[k-r]X_m[k-r] +$$
$$Z_m[k+l] = C_m(\tilde{\varepsilon}, 0)H_m[k]X_m[k] +$$
$$\sum_{r=1}^{N-1} C_m(\tilde{\varepsilon}, r)H_m[k-r]X_m[k-r] + Z_m[k+l],$$

where the last equality follows from (9) and (11). From (13), it can be seen that the desired signal $H_m[k]X_m[k]$ is affected by the CFO in several ways. The signal $H_m[k]X_m[k]$ is received by the (k+l)-th subcarrier instead of the k-th subcarrier. The magnitude of $H_m[k]X_m[k]$ is attenuated by $$|C_m(\tilde{\varepsilon}, 0)| = \left|\frac{\sin(\pi\tilde{\varepsilon})}{N\sin(\pi\tilde{\varepsilon}/N)}\right|.$$

The phase of $H_m[k]X_m[k]$ is rotated by $\tilde{\pi\epsilon}(1-1/N)+2\pi\epsilon m(1+\alpha)+\theta_0$. The signal $H_m[k]X_m[k]$ is subject to the ICI $$\sum_{r=1}^{N-1} C_m(\tilde{\varepsilon}, r)H_m[k-r]X_m[k-r]$$

addition to the noise $Z_m[k+l]$.

Since the CFO attenuates the desired signal and introduces ICI, the SNR decreases and the SER increases. In the next two sections, the SNR and SER are analyzed in detail. As was shown above, the integer frequency offset l circularly shifts the received signal by l but does not affect the SNR nor SER as long as the power of the background noise is the same for all subcarriers. Thus, it is assumed in the SNR and SER analysis that $-\frac{1}{2} \leq \epsilon < \frac{1}{2}$ and so l=0 in the following. Furthermore, for the notational simplicity, $C_m[k]$ is used instead of $C_m(\epsilon,k)$.

The SNR expression is derived below in the presence of CFO separately for AWGN channels, time-invariant frequency-selective channels, and multipath fading channels. For the AWGN channel, the channel gain can be represented as follows:

$$H_m[k]=1 \text{ for all } m \text{ and } k. \qquad (14)$$

When coherent demodulation is employed, the receiver should be able to estimate the phase of $C_m[0]$ in order to decode the received symbol $Y_m[k]$ correctly, as can be seen from (13). One of the ways of estimating the phase is to use training preambles or pilot subcarriers, where known symbols are transmitted. Let $C_m[0]=|C_m[0]|e^{j\theta_m[0]}$ and assume that the estimate of the phase $\theta_m[0]$ is perfect. Then, the decision metric $M_m[k]$ is obtained by multiplying the received symbol $Y_m[k]$ by $e^{-j\theta_m[0]}$:

$$M_m[k] = e^{-j\theta_m[0]}Y_m[k] = |C_m[0]|X_m[k] + I'_m[k] + Z'_m[k], \qquad (15)$$

where the ICI $I'_m[k]$ is $$I'_m[k] = e^{-j\theta_m[0]}\sum_{r=1}^{N-1} C_m[r]X_m[k-r] \qquad (16)$$

and the noise $Z'_m[k]$ is $$Z'_m[k]=e^{-j\theta_m[0]}Z_m[k]. \qquad (17)$$

Since the ICI $I'_m[k]$ is a linear combination of the $X_m[r]$ for $r \neq k$, the ICI is uncorrelated with the desired signal $|C_m[0]|X_m[k]$ when the data symbols in each subcarrier are uncorrelated with those in other subcarriers. Furthermore, the ICI is zero-mean since the transmit symbols $X_m[k]$ are zero-mean. Moreover, the background noise $Z'_m[k]$ is zero-mean and is uncorrelated with the desired signal and the ICI. Thus, the desired signal, the ICI, and the noise are zero-mean and uncorrelated with one another.

The SNR of the k-th subcarrier in the presence of the carrier frequency offset $\epsilon$ is given by $$SNR(k) = \frac{E[|C_m[0]X_m[k]|^2]}{E[|I'_m[k] + Z'_m[k]|^2]}. \qquad (18)$$

The power of the desired signal is equal to $$E[|C_m[0]X_m[k]|^2]=|C_m[0]|^2\sigma_X^2, \qquad (19)$$

where $\sigma_X^2 \triangleq E[|X_m[k]|^2]-|E[X_m[k]]|^2=E[|X_m[k]|^2]$. Since the ICI and the noise are zero-mean and they are independent of each other, the power of the ICI-plus-noise signal is equal to the sum of the power of the ICI and the background noise:

$$E[|I'_m[k]+Z'_m[k]|^2]=E[|I'_m[k]|^2]+E[|Z'_m[k]|^2]. \qquad (20)$$

The power of the ICI $I'_m[k]$ can be expressed as $$E[|I'_m[k]|^2] = E\left[\sum_{r=1}^{N-1}\sum_{s=1}^{N-1} C_m[r]C_m^*[s]X_m[k-r]X_m^*[k-s]\right] = \qquad (21)$$
$$\sum_{r=1}^{N-1}\sum_{s=1}^{N-1} C_m[r]C_m^*[s]E[X_m[k-r]X_m^*[k-s]] \stackrel{(a)}{=} \sum_{r=1}^{N-1} |C_m[r]|^2\sigma_X^2,$$

where (a) follows from the fact that the data symbols in each subcarrier are uncorrelated with those in other subcarriers, and $$|C_m[r]|^2 = \left|\frac{\sin(\pi\varepsilon)}{N\sin(\pi(\varepsilon-r)/N)}\right|^2 \qquad (22)$$

from (11). The (k-r)-th subcarrier contributes $|C_m[r]|^2\sigma_X^2$ to the power of the ICI $I_m[k]$ that affects the k-th subcarrier. It can be easily shown that $$|C_m[1]| \geq |C_m[-1]| \geq |C_m[2]| \geq |C_m[-2]| \geq \ldots \geq |C_m[N/2]| \qquad (23)$$

for $0 \leq \epsilon \leq \frac{1}{2}$, and $$|C_m[-1]| \geq |C_m[1]| \geq |C_m[-2]| \geq |C_m[2]| \geq \ldots \geq |C_m[N/2]| \qquad (24)$$

for $-\frac{1}{2} \leq \epsilon \leq 0$. Thus, the subcarriers close to the k-th subcarrier contribute more to the ICI $I_m[k]$ than those far from the k-th subcarrier. Although the contribution of each subcarrier to $I_m[k]$ depends on the distance from the k-th subcarrier, the power of the ICI $I_m[k]$ is the same for all subcarriers and is simply expressed as $$E[|I'_m[k]|^2]=(1-|C_m[0]|^2)\sigma_X^2. \qquad (25)$$

by noticing that $$\sum_{r=0}^{N-1}|C_m[r]|^2 = N\sum_{n=0}^{N-1}|c_m(\varepsilon,n)|^2 = 1, \qquad (26)$$

where a basic property of the DFT is used along with the fact that $|c_m(\varepsilon,n)|=1/N$ from (7). The above expression for the ICI power is not an approximation unlike conventional approaches. The power of the noise $Z'_m[k]$ is the same as the power of $Z_m[k]$:

$$E[|Z'_m[k]|^2]=\sigma_Z^2. \qquad (27)$$

Thus, the power of the ICI-plus-noise signal is $$E[|I'_m[k]+Z'_m[k]|^2]=(1-|C_m[0]|^2)\sigma_X^2+\sigma_Z^2. \qquad (28)$$

From (18), (19), and (28), the SNR of the k-th subcarrier can be expressed as $$SNR_{(\varepsilon,k)} = \frac{f_N^2(\varepsilon)SNR_0}{(1-f_N^2(\varepsilon))SNR_0 + 1}, \qquad (29)$$

where $SNR_0$ is the SNR in the absence of the carrier frequency offset, i.e., $$SNR_0 = \frac{\sigma_X^2}{\sigma_Z^2},$$

and $$f_N(\varepsilon) \triangleq |C_m[0]| = \left|\frac{\sin(\pi\varepsilon)}{N\sin(\pi\varepsilon/N)}\right| \qquad (30)$$

from (11).

From this SNR expression, the effect of the CFO is to decrease the signal power by $f_N^2(\varepsilon)$ and to convert the decreased power to interference power. Since $f_N(\varepsilon)=f_N(-\varepsilon)$, it can be seen from (29) that the SNR for the frequency offset $+\varepsilon$ is the same as the SNR for the frequency offset $-\varepsilon$. The SNR decreases as the frequency offset $\varepsilon$ increases from 0 to ½ because $f_N(\varepsilon)$ is a monotonically decreasing function of $\varepsilon$ for $0 \leq \varepsilon < ½$.

$$f'_N(\varepsilon) = \frac{\pi\left(N\cos(\pi\varepsilon)\sin\left(\frac{\pi\varepsilon}{N}\right) - \sin(\pi\varepsilon)\cos\left(\frac{\pi\varepsilon}{N}\right)\right)}{N^2\sin^2\left(\frac{\pi\varepsilon}{N}\right)} \geq 0,$$

which is equivalent to $$N\tan\left(\frac{\pi\varepsilon}{N}\right) \geq \tan(\pi\varepsilon).$$

The function $$h(x) = x\tan\left(\frac{\pi\varepsilon}{N}\right)$$

increasing function for $x \geq 1$ since $$h'(x) = \tan\left(\frac{\pi\varepsilon}{x}\right) + \frac{x}{\cos^2\left(\frac{\pi\varepsilon}{N}\right)} \geq 0$$

for $x \geq 1$. Hence, $h(N) \geq h(1)$ and $f'_N(\varepsilon) \geq 0$. The SNR depends not only on the frequency offset $\varepsilon$ but also on the number of subcarriers, N, because $f_N(\varepsilon)$ depends on N. However, as N increases, $f_N(\varepsilon)$ converges to $$\frac{\sin(\pi\varepsilon)}{\pi\varepsilon} = sinc(\varepsilon)$$

because $N\sin(\pi\varepsilon/N)$ converges to $\pi\varepsilon$. Then the SNR in (29) converges to $$SNR(\varepsilon,k) = \frac{sinc^2(\varepsilon)SNR_0}{(1-sinc^2(\varepsilon))SNR_0 + 1}, \qquad (31)$$

as N increases to infinity.

Using the SNR expression (29), the SNR degradation $D(\varepsilon)$ of any subcarrier k due to the carrier frequency offset can be expressed as:

$$D(\varepsilon) \triangleq \frac{SNR_0}{SNR(\varepsilon,k)} = \frac{1+(1-f_N^2(\varepsilon))SNR_0}{f_N^2(\varepsilon)}. \qquad (32)$$

For small $\varepsilon$ such that $|\varepsilon| \ll 1/\varepsilon$, the SNR degradation can be approximated using the Taylor series expansion $$D(\varepsilon) \approx D(0) + D'(0)\varepsilon + \frac{1}{2}D''(0)\varepsilon^2$$

as is shown below:

$$D(\varepsilon) \approx 1 + \frac{\pi^2}{3}\left(1-\frac{1}{N^2}\right)(1+SNR_0)\varepsilon^2. \qquad (33)$$

When $$|\varepsilon| \ll \sqrt{\frac{3}{\pi^2(1+SNR_0)}},$$

the SNR degradation in dB is $$D_{dB}(\varepsilon)10\log_{10}(D(\varepsilon)) \approx \frac{10}{\ln 10}\frac{\pi^2}{3}\left(1-\frac{1}{N^2}\right)(1+SNR_0)\varepsilon^2, \qquad (34)$$

because $$\log_{10}(1+x) \approx \frac{x}{\ln 10} \text{ for } x \ll 1.$$

This SNR degradation approximation agrees well with the conventional expression;

$$D_{dB}(\varepsilon) \approx \frac{10}{\ln 10} \frac{\pi^2}{3} SNR_0 \varepsilon^2, \quad (35)$$

which is valid for large number of subcarriers, N, and high $SNR_0$.

For a time-invariant frequency-selective channel, the channel can be represented as $$H_m[k] = H[k] \text{ for all } m. \quad (36)$$

For this channel, a coherent receiver should be able to estimate the phase of $C_m[0]H[k]$ in order to decode the received symbol $Y_m[k]$ correctly, as can be seen from (13). Let $C_m[0]H[k] = |C_m[0]H[k]|e^{j\theta_m[0]}$, and assume that the estimate of the phase $\theta_m[0]$ is perfect. Then, the decision metric $M_m[k]$ is obtained by multiplying the received symbol $Y_m[k]$ by $e^{-j\theta_m[0]}$:

$$M_m[k] = e^{-j\theta_m[0]} Y_m[k] = |C_m[0]H[k]|X_m[k] + I'_m[k] + Z'_m[k], \quad (37)$$

where the ICI $I'_m[k]$ is $$I'_m[k] = e^{-j\theta_m[0]} \sum_{r=1}^{N-1} C_m[r]H[k-r]X_m[k-r] \quad (38)$$

and the noise $Z'_m[k]$ is $$Z'_m[k] = e^{-j\theta_m[0]} Z_m[k]. \quad (39)$$

The SNR expression is derived for the general case where the transmit power of each subcarrier can be different. This is because the channel gain of each subcarrier of a frequency-selective channel can be different. The SNR of the k-th subcarrier in the presence of the carrier frequency offset $\epsilon$ is given by $$SNR(k) = \frac{E[|C_m[0]H[k]X_m[k]|^2]}{E[|I'_m[k] + Z'_m[k]|^2]}. \quad (40)$$

The power of the desired signal in the k-th subcarrier is equal to $$E[|C_m[0]H[k]X_m[k]|^2] = |C_m[0]|^2|H[k]|^2\sigma_X^2[k], \quad (41)$$

the power of the ICI $I'_m[k]$ is expressed as $$E[|I'_m[k]|^2] = \sum_{r=1}^{N-1} |C_m[r]|^2|H[k-r]|^2\sigma_X^2[k-r], \quad (42)$$

where $\sigma_X^2[k]$ is the power of the transmit signal at the k-th subcarrier. The power of the noise $Z_m[k]$ is equal to $\sigma_Z^2$. Thus, the SNR of k-th subcarrier is equal to $$SNR(k) = \frac{|C_m[0]H[k]|^2\sigma_X^2[k]}{\sum_{r=1}^{N-1}|C_m[r]|^2|H[k-r]|^2\sigma_X^2[k-r] + \sigma_Z^2} \quad (43)$$

$$= \frac{|C_m[0]|^2 SNR_0(k)}{\sum_{r=1}^{N-1}|C_m[r]|^2 SNR_0(k-r) + 1}, \quad (44)$$

where $SNR_0(k)$ is the SNR of k-th subcarrier in the absence of a frequency offset:

$$SNR_0[k] = \frac{|H[k]|^2\sigma_X^2[k]}{\sigma_Z^2}. \quad (45)$$

As can be seen from the above expression, the SNR for time-invariant frequency-selective channels may have different values depending on the subcarrier. However, if the power of each subcarrier is chosen such that the SNR is the same for all subcarriers in the absence of a frequency offset, then the SNR in the presence of a frequency offset is also the same for all subcarriers:

$$SNR(\varepsilon, k) = \frac{|C_m[0]|^2 SNR_0}{\sum_{r=1}^{N-1}|C_m[r]|^2 SNR_0 + 1} = \quad (46)$$

$$\frac{|C_m[0]|^2 SNR_0}{(1 - |C_m[0]|^2) SNR_0 + 1} = \frac{f_N^2(\varepsilon) SNR_0}{(1 - f_N^2(\varepsilon)) SNR_0 + 1}.$$

The decision metric for a multipath fading channel is the same as for a time-invariant frequency-selective channel:

$$M_m[k] = |C_m[0]H_m[k]|X_m[k] + I'_m[k] + Z'_m[k], \quad (47)$$

where $I'_m[k]$ and $Z'_m[k]$ are defined in (38) and (39). However, note that the multiplication factor $|C_m[0]H_m[k]|$ of $X_m[k]$ is a random quantity, unlike for the case of a time-invariant frequency-selective channel. In some prior approaches, $C_m[0]H_m[k]$ was factored into a constant component, $E[|C_m[0]H_m[k]|]$, and a time-varying component, $(|C_m[0]H_m[k]| - E[|C_m[0]H_m[k]|])$. $E[51 C_m[0]H_m[k]|]X_m[k]$ was viewed as a desired signal and $(|C_m[0]H_m[k]| - E[|C_m[0]H_m[k]|])X_m[k]$ as an additional noise component. However, $|C_m[0]H_m[k]|X_m[k]$ is the desired signal according to some embodiments of the present invention for the following reasons. For the case of constant-magnitude modulation schemes such as MPSK, $|C_m[0]H_m[k]|$ scales the magnitude of $X_m[k]$ without altering the phase of $X_m[k]$. Therefore, $|C_m[0]H_m[k]|X_m[k]$ should be viewed as the desired signal. When a non-constant-magnitude modulation scheme such as MQAM is employed, the magnitude of $C_m[0]H_m[k]$ should be estimated along with the phase of $C_m[0]H_m[k]$ for the correct demodulation of the transmitted signals. Since the knowledge of $|C_m[0]H_m[k]|$ is used in demodulation, $|C_m[0]H_m[k]|X_m[k]$ should be viewed as the desired signal. With the above interpretation on the desired signal, the SNR of the k-th subcarrier in the presence of the carrier frequency offset $\epsilon$ is given by $$SNR(\varepsilon, k) = \frac{E[|C_m[0]H_m[k]X_m[k]|^2]}{E[|I'_m[k] + Z'_m[k]|^2]}. \quad (48)$$

The power of the desired signal is equal to:

$$E[|C_m[0]H_m[k]X_m[k]|^2] = |C_m[0]|^2 E[|H_m[k]|^2]\sigma_X^2, \quad (49)$$

because the channel $H_m[k]$ is independent of the transmit symbol $X_m[k]$. Since the channel response $h_m[n]$ at time n is uncorrelated with the response $h_m[p]$ at time $p \ne n$, $E[|H_m[k]|^2]$ is $$E[|H_m[k]|^2] = E\left[\sum_{n=0}^{N_g}\sum_{p=0}^{N_g} h_m[n]h_m^*[p]e^{-j2\pi(n-p)k/N}\right] = \sum_{n=0}^{N_g} E[|h_m[n]|^2]\overline{\gamma}. \quad (50)$$

By combining (49) and (50), the power of the desired signal can be written as $$E[|C_m[0]H_m[k]X_m[k]|^2] = |C_m[0]|^2 \overline{\gamma}\sigma_X^2. \quad (51)$$

The power of the ICI $I'_m[k]$ is equal to $$E[|I'_m[k]|^2] = \sum_{r=1}^{N-1} |C_m[r]|^2 E[|H_m[k-r]|^2]\sigma_X^2 \quad (52)$$

$$= \sum_{r=1}^{N-1} |C_m[r]|^2 \overline{\gamma}\sigma_X^2$$

$$= (1 - |C_m[0]|^2)\overline{\gamma}\sigma_X^2.$$

and the power of the noise $Z'_m[k]$ is equal to $\sigma_Z^2$. Because the average power of the channel response $H_m[k]$ is the same for all subcarriers, the average power of the desired signal and the ICI does not depend on subcarriers, as can be seen from (51) and (52).

Then the SNR of the k-th subcarrier is expressed as $$SNR(\varepsilon, k) = \frac{f_N^2(\varepsilon)SNR_0}{(1-f_N^2(\varepsilon))SNR_0 + 1}, \quad (53)$$

where $$SNR_0 = \frac{\overline{\gamma}\sigma_X^2}{\sigma_Z^2}.$$

This expression is the same as the SNR expression for the AWGN channel except that $SNR_0$ includes the term $\overline{\gamma}$. So, all the SNR degradation expressions for the AWGN channel can be applied to a multipath fading channel.

Simple SER expressions in the presence of the CFO are found using the SNR expressions derived in the previous section. The SER expressions are derived separately for AWGN channels, time-invariant frequency-selective channels, and multipath fading channels.

For AWGN channels, the SER can be calculated using the SNR expression in the previous section and by approximating the ICI-plus-noise signal as a Gaussian random variable. The ICI $I'_m[k]$ can be approximated as a Gaussian random variable because $$I'_m[k] = \sum_{r=1}^{N-1} e^{-j\theta_m[0]} C_m[r] X_m[k-r]$$

is a sum of N zero-mean independent random variables, where the approximation becomes more accurate as N increases. Thus, $I'_m[k] + Z'_m[k]$ can be approximated as a zero-mean Gaussian random variable with variance $(1-f_N^2(\varepsilon))$ $\sigma_X^2 + \sigma_Z^2)$. By the method of nearest neighbor union bound, the SER for MQAM and MPSK can be found:

$$P_e(\varepsilon) = aQ(b\sqrt{SNR(\varepsilon)}), \quad (54)$$

where $$Q(x) = \frac{1}{\sqrt{2\pi}} \int_x^\infty e^{-t^2/2} dt$$

and the constants a and b are determined by the modulation type and the constellation size.

Although prior methods for accurately calculating SER have been developed, they are quite complex and hard to evaluate. The SER in this approach is not accurate if it is calculated using the SNR degradation with the assumption that the ICI is Gaussian. However, the conventional SNR degradation expression is approximate and inaccurate especially for large CFO values. By using (54) along with the exact yet simple SNR expression (29), the SER can be calculated quite accurately, as is shown numerically below.

The SER for time-invariant frequency-selective channels can be found in a similar way as that for the AWGN channel by assuming that the distribution of the interference follows the Gaussian distribution: the SER of k-th subcarrier is $$P_e(\varepsilon,k) = aQ(b\sqrt{SNR(\varepsilon,k)}), \quad (55)$$

where $SNR(\varepsilon,k)$ is given by (44).

Frequency-selective fading channels do not have a simple analytic SER expression. However, the average SER expression for a flat fading channel can be derived as follows. For flat fading, the channel can be represented as follows:

$$h_m[n] = h_m \delta[n]. \quad (56)$$

When the squared magnitude of the channel gain is $\gamma$, the SNR is given by $$SNR(\varepsilon, \gamma) = \frac{f_N^2(\varepsilon)\gamma\sigma_X^2}{(1-f_N^2(\varepsilon))\gamma\sigma_X^2 + \sigma_Z^2}. \quad (57)$$

The average SER is then equal to $$\overline{P_e(\varepsilon)} = \int_{-\infty}^{\infty} aQ(b\sqrt{SNR(\varepsilon,\gamma)})p_{|h|^2}(\gamma)d\gamma, \quad (58)$$

where $p_{|h|^2}(\gamma)$ is the probability density function (pdf) of the squared magnitude of the channel gain. For example, in case of the Rayleigh fading channel, the pdf is given by $$p_{|h|^2}(\gamma) = \frac{1}{\overline{\gamma}} e^{-x\sqrt{\gamma}}, \quad (59)$$

where $\overline{\gamma}$ is the average of $\gamma$: $\overline{\gamma} = E[\gamma] = E[|h_m|^2]$.

The SNR and SER are evaluated numerically below for various values of the CFO, $\varepsilon$ and the nominal SNR or $SNR_0$. The number N of subcarriers is chosen to be equal to 64.

Figure 3:
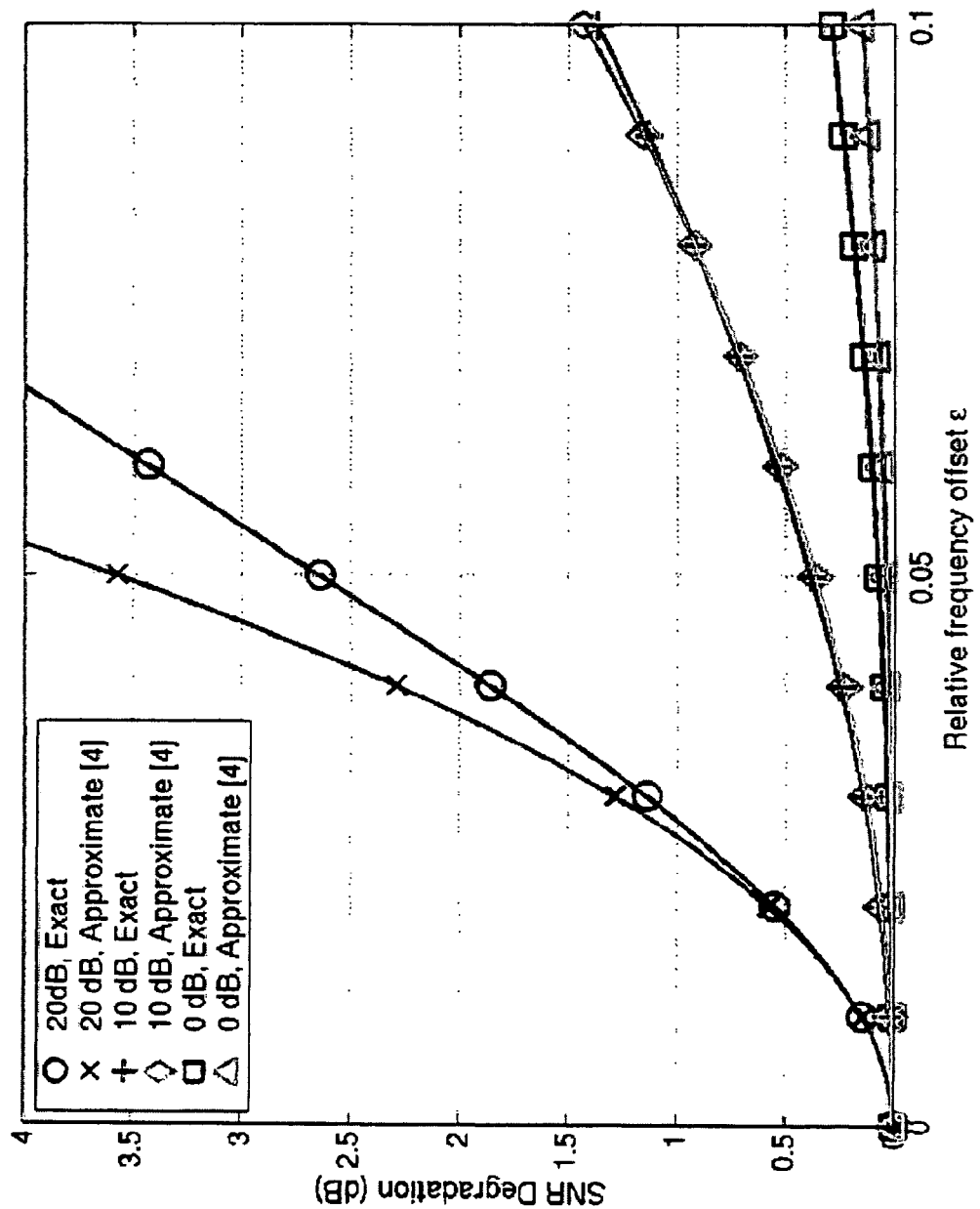
FIG. 3 illustrates SNR degradation calculations according to the present invention and the prior art due to the carrier frequency offset (CFO) for the AWGN channel with $$\frac{\sigma_X^2}{\sigma_Z^2} = 20 \text{ dB},$$

Referring now to FIG. 3, the SNR degradation due to the CFO for the AWGN channel is shown. The SNR degradation is calculated using the exact expression (32) and the approximate prior art expression. As can be seen from FIG. 3, the approximate expression is not always accurate. For example, when $SNR_0$ is 20 dB, the approximate prior art expression has an error of 0.9 dB for ε=0.05. This clearly shows that the exact expression should be used in order to assess the effect of the CFO accurately.

Referring now to FIG. 4, the exact SNR degradation for the AWGN channel is plotted as a function of the relative frequency offset ε when $SNR_0$ is 5 dB, 10 dB, 15 dB and 20 dB. As can be seen, the SNR degradation increases as the frequency offset ε increases. Furthermore, the CFO causes more degradation to a system operating at high SNR values than to a system operating at low SNR values.

Referring now to FIG. 5, the frequency offset values ε* that incur 3 dB, 2 dB, 1 dB, and 0.1 dB degradation in SNR are shown. The frequency offset ε* indicates the maximum allowable frequency offset that guarantees that the SNR degradation does not exceed a given value. For example, when $SNR_0$ is 10 dB and only 1 dB degradation in SNR is allowed, the relative frequency offset should be limited to be less than 0.08. FIG. 5 can be used to determine the maximum allowable CFO that causes less degradation than a target SNR degradation for a given SNR.

Referring now to FIGS. 6 and 7, the SER for AWGN channels is plotted in the presence of a frequency offset when the modulation scheme is quadrature PSK (QPSK) and 16 QAM, respectively. As can be seen from FIG. 6, the SER evaluated with (54) is very close to the SER computed by Monte Carlo simulation even when the number of subcarriers is only 64. On the other hand, the SER evaluated with the SNR degradation prior art approximated expression is inaccurate especially at high SNR and large CFO. The SER evaluated with the SNR degradation prior art expression has larger error for 16 QAM than for QPSK as shown in FIG. 7. However, the SER evaluated with (54) along with the exact SNR expression (29) is still quite accurate even for 16 QAM. Thus, as long as the exact SNR expression (29) is used to evaluate the SER, the simple SER expression (54) can be used instead of more complex prior art expressions.

Referring now to FIG. 8, the pdf of the magnitude square of the channel gain is shown when the channel magnitude follows the Rician distribution with K-factor 1, the Rayleigh distribution, and the Nakagami distribution with m=½.

Referring now to FIGS. 9A-9D, plots the SER for a flat fading channel with the above channel distributions are shown. As can be seen, the effect of the CFO is most significant in the AWGN channel followed by the Rician fading channel with K=1, the Rayleigh fading channel, and the Nakagami fading channel with m=½ in this order. This can be explained as follows. The SNR degradation at small SNR values is smaller than the SNR degradation at large SNR values as can be seen from FIG. 6. The pdf values at small channel gains are larger in the Nakagami distribution compared to the other fading distributions. Similarly, the Rayleigh distribution has larger pdf values at small channel gains than the Rician distribution. The effect of the CFO is less prominent for the channel with large pdf values at small channel gains than for the channel with small pdf values at small channel gains because the SNR degradation at small SNR values is small.

The foregoing sections analyzed the effect of the carrier frequency offset in coherent OFDM systems for AWGN channels, time-invariant frequency-selective channels, and multipath fading channels. The CFO attenuates the desired signal and causes inter-carrier interference, thus reducing the SNR. Simple yet exact SNR expressions were derived in the presence of a carrier frequency offset. Unlike the prior art expressions, they are not approximations expressions. From the SNR expressions, it was found that the SNR degradation increases monotonically as the CFO increases and that the SNR degradation of a system operating at high SNR values is larger than that of a system operating at low SNR values. SER expressions were also derived, and it was shown by simulation that they are accurate. The numerical results show that the frequency synchronization requirements for flat-fading channels are not as stringent as those for AWGN channels.

The following section will approximate SNR Degradation. By the Taylor series expansion, the SNR degradation D(ε) can be approximated as:

$$D(\varepsilon) \approx D(0) + D'(0)\varepsilon + \frac{1}{2}D''(0)\varepsilon^2. \tag{60}$$

From (32), the SNR degradation is rewritten as:

$$D(\varepsilon) = \frac{1 + SNR_0}{f_N^2(\varepsilon)} - SNR_0, \tag{61}$$

The first derivative of D(ε) is:

$$D'(\varepsilon) = -\frac{2(1 + SNR_0)f_N'(\varepsilon)}{f_N^3(\varepsilon)}, \tag{62}$$

and the second derivative is:

$$D''(\varepsilon) = -2(1 + SNR_0)\frac{f_N(\varepsilon)f_N''(\varepsilon) - 3(f_N'(\varepsilon))^2}{f_N^4(\varepsilon)}. \tag{63}$$

By defining $$g(\varepsilon) = \frac{\sin(\varepsilon)}{\varepsilon},$$

the function $$f_N(\varepsilon) = \frac{\sin(\pi\varepsilon)}{N\sin(\pi\varepsilon/N)}$$

can be rewritten as:

$$f_N(\varepsilon) = \frac{g(\pi\varepsilon)}{g(\pi\varepsilon/N)}. \tag{64}$$

Since $$g(0) = \lim_{\varepsilon \to 0} \frac{\sin(\varepsilon)}{\varepsilon} = \lim_{\varepsilon \to 0} \frac{\cos(\varepsilon)}{1} = 1$$

by L'Hôpital's rule, $$f_N(0) = \frac{g(0)}{g(0)} = 1. \tag{65}$$

The first derivative of $f_N(\epsilon)$ is:

$$f_N'(\epsilon) = \frac{\pi}{N} \frac{Ng'(\pi\epsilon)g\left(\frac{\pi\epsilon}{N}\right) - g(\pi\epsilon)g'\left(\frac{\pi\epsilon}{N}\right)}{g^2(\pi\epsilon/N)}, \quad (66)$$

where $$g'(\epsilon) = \frac{\epsilon \cos(\epsilon) - \sin(\epsilon)}{\epsilon^2} \quad (67)$$

Since $$g'(0) = \lim_{\epsilon \to 0} \frac{\epsilon \cos(\epsilon) - \sin(\epsilon)}{\epsilon^2} = -\lim_{\epsilon \to 0} \frac{\epsilon \sin(\epsilon)}{2\epsilon} = 0$$

by L'Hôpital's rule, $$f_N'(0) = \frac{\pi}{N} \frac{Ng'(0)g(0) - g(0)g'(0)}{g^2(0)} = 0. \quad (68)$$

The second derivative of $f_n(\epsilon)$ is:

$$f_N''(\epsilon) = \frac{\pi^2}{N^2} \frac{\left[N^2 g''(\pi\epsilon)g\left(\frac{\pi\epsilon}{N}\right) - g(\pi\epsilon)g''\left(\frac{\pi\epsilon}{N}\right)\right]g\left(\frac{\pi\epsilon}{N}\right) - 2g'\left(\frac{\pi\epsilon}{N}\right)\left[Ng'(\pi\epsilon)g\left(\frac{\pi\epsilon}{N}\right) - g(\pi\epsilon)g'\left(\frac{\pi\epsilon}{N}\right)\right]}{g^3\left(\frac{\pi\epsilon}{N}\right)} \quad (69)$$

where $$g''(\epsilon) = \frac{-\epsilon^2 \sin(\epsilon) - 2[\epsilon \cos(\epsilon) - \sin(\epsilon)]}{\epsilon^3} \quad (70)$$

By L'Hôpital's rule, $$g''(0) = -\lim_{\epsilon \to 0} \frac{\sin(\epsilon)}{\epsilon} - \lim_{\epsilon \to 0} \frac{2[\epsilon \cos(\epsilon) - \sin(\epsilon)]}{\epsilon^3} \quad (71)$$

$$= -1 + \lim_{\epsilon \to 0} \frac{2\epsilon \sin(\epsilon)}{3\epsilon^2}$$

$$= -1 + \frac{2}{3} = -\frac{1}{3},$$

and $$f_N''(0) = \frac{\pi^2}{N^2} \frac{[N^2 g''(0)g(0) - g(0)g''(0)]g(0) - 2g'(0)[Ng'(0)g(0) - g(0)g'(0)]}{g^3(0)} = -\frac{\pi^2}{3}\left(1 - \frac{1}{N^2}\right). \quad (72)$$

From (61) and (65), $D(0)=1$. From (62) and (68), $D'(0)=0$. From (63) and (72), $$D''(0) = \frac{2\pi^2}{3}\left(1 - \frac{1}{N^2}\right)(1 + SNR_0).$$

Therefore, $$D(\epsilon) \approx 1 + \frac{\pi^2}{3}\left(1 - \frac{1}{N^2}\right)(1 + SNR_0)\epsilon^2. \quad (73)$$

Section 2

Effect of CFO on Frequency-Domain Differential Demodulation

The effect of the CFO on frequency-domain differential demodulation will be described below. A simple yet exact SNR expression for frequency-domain differential modulation OFDM systems is derived in the presence of the CFO. Using this SNR expression, the SNR degradation due to the CFO is evaluated, and the symbol error rate (SER) is calculated. In the analysis of SNR, the channel is assumed to be a flat fading channel in order to isolate the effect of the CFO from the unequal channel response between adjacent subcarriers.

Figure 1:
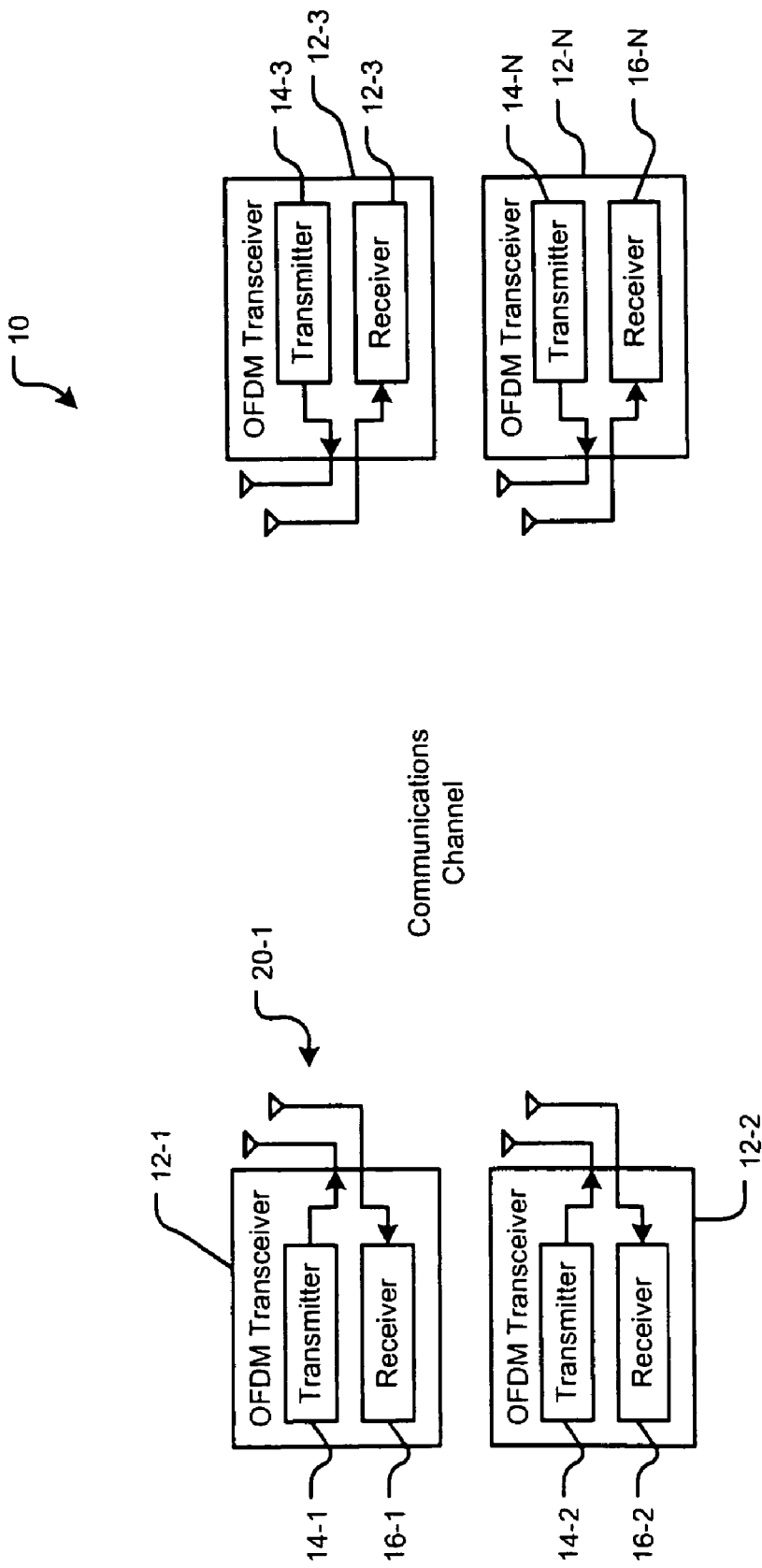
FIG. 1 is a functional block diagram of multiple OFDM transceivers that communicate over a wireless or wired channel.

An OFDM system transmits information as a series of OFDM symbols. Referring back to FIG. 1, the baseband equivalent model of an OFDM system. As was previously shown, the inverse discrete Fourier transform (IDFT) is performed on the information symbols $X_m[k]$ for $k=0,1,\ldots,N-1$ to produce the time-domain samples $x_m[n]$ of the m-th OFDM symbol:

$$x_m[n] = \begin{cases} \frac{1}{N} \sum_{k=0}^{N-1} X_m[k] e^{j2\pi k(n-N_g)/N}, & \text{if } 0 \le n \le N + N_g - 1 \\ 0, & \text{otherwise,} \end{cases} \quad (1)$$

where N and $N_g$ are the numbers of data samples and cyclic prefix samples, respectively. The OFDM symbol $x_m[n]$ is transmitted through a channel $h_m[n]$ and is corrupted by Gaussian noise $\tilde{z}_m[n]$. The channel $h_m[n]$ is assumed to be block-stationary, i.e., time-invariant during each OFDM symbol. With this assumption, the output $\tilde{y}_m[n]$ of the channel can be represented as a simple convolution operation as follows:

$$\tilde{y}_m[n] = h_m[n] * x_m[n] + \tilde{z}_m[n], \quad (2)$$

where * denotes the convolution operation, i.e., $$h_m[n] * x_m[n] = \sum_{r=-\infty}^{\infty} h_m[r] x_m[n-r],$$

and $\tilde{z}_m[n]$ is additive white Gaussian noise with variance $\sigma_z^2$.

When the receiver oscillator is not perfectly matched to the transmitter oscillator, there can be a CFO $\Delta f = f_t - f_r$ between the transmitter carrier frequency $f_t$ and the receiver carrier frequency $f_r$. In addition, there may be a phase offset $\theta_0$ between the transmitter and the receiver carrier. The received symbol $y_m[n]$ is then $$y_m[n] = e^{j[2\pi \Delta f(n + m(N+N_g))T + \theta_0]}(h_m[n] * x_m[n] + \tilde{z}_m[n]), \quad (3)$$

where T is the sampling period.

The frequency offset $\Delta f$ can be represented with respect to the subcarrier bandwidth $1/NT$ by defining the relative frequency offset $\epsilon$ as $$\epsilon \triangleq \frac{\Delta f}{1/NT} = \Delta f NT \quad (4)$$

Using the relative frequency offset $\epsilon$, the received symbol $y_m[n]$ is expressed as $$y_m[n] = e^{j\frac{2\pi \epsilon n}{N}} e^{j2\pi \epsilon m(1+\alpha)} e^{j\theta_0}(h_m[n] * x_m[n]) + z_m[n], \quad (5)$$

where $$\alpha = \frac{N_g}{N}$$

and $$z_m[n] = e^{j\frac{2\pi\varepsilon n}{N}} e^{j2\pi\varepsilon m(1+\alpha)} e^{j\theta_0} \tilde{z}_m[n].$$

The noise $z_m[n]$ is a zero-mean complex-Gaussian random-variable with variance $\sigma_Z^2 = \sigma_{\tilde{z}}^2$ and is independent of the transmit signal and the channel. To simplify the notation, $c_m[n]$ is defined as $$c_m[n] \triangleq \frac{1}{N} e^{j2\pi\varepsilon n/N} e^{j2\pi\varepsilon m(1+\alpha)} e^{j\theta_0}. \tag{6}$$

The received sample $y_m[n]$ is then $$y_m[n] = N c_m[n](h_m[n] * x_m[n]) + z_m[n]. \tag{7}$$

For Frequency-Domain Differential Demodulation (FDDD), the following description quantifies the effect of the CFO on the SNR and SER of differential phase-shift-keying (DPSK) modulation in OFDM systems. The relative frequency offset $\varepsilon$ can be divided into an integer part l and a non-integer part $\tilde{\varepsilon}$ such that $-\frac{1}{2} \leq \tilde{\varepsilon} < \frac{1}{2}$:

$$\varepsilon = l + \tilde{\varepsilon}. \tag{8}$$

It can be easily seen from (4) that the absolute frequency offset that corresponds to the above relative frequency offset is $(1+\tilde{\varepsilon})$ times the subcarrier bandwidth 1/NT.

To simplify the notation, $H_m[k]$ and $X_m[k]$ are assumed to be periodic with period N. The discrete Fourier transform (DFT) of $y_m[n]$ in the presence of the carrier frequency offset $\varepsilon = l + \tilde{\varepsilon}$ is then $$Y_m[k] = C_m[l] H_m[k-l] + X_m[k-l] + I_m[k] + Z_m[k], \tag{9}$$

where $$I_m[k] = \sum_{r \neq l} C_m[r] H_m[k-r] X_m[k-r], \tag{10}$$

and $C_m[k]$, $H_m[k]$, and $Z_m[k]$ are the DFTs of $c_m[n]$, $h_m[n]$, and $z_m[n]$. From the definition of the DFT, it can be derived in a straightforward way [7] that $$C_m[k] = \sum_{n=0}^{N-1} c_m[n] e^{-j2\pi n k/N} = \left(\frac{\sin(\pi(\varepsilon-k))}{N \sin(\pi(\varepsilon-k)/N)} e^{j\pi(\varepsilon-k)(1-1/N)}\right) \cdot e^{j[2\pi\varepsilon m(1+\alpha)+\theta_0]}. \tag{11}$$

The integer frequency offset l causes the cyclic shift of the subcarriers, whereas the residual frequency offset $\tilde{\varepsilon}$ reduces the desired signal and introduces ICI, resulting in SNR degradation. It is assumed below that the integer frequency offset l is zero for the sake of simplicity since l does not affect the SNR and SER analysis.

The decision metric $M_m[k]$ for frequency-domain differential demodulation is then $$M_m[k] = Y_m^*[k-1] Y_m[k] = \tag{12}$$
$$|C_m[0]|^2 H_m^*[k-1] H_m[k] X_m^*[k-1] X_m[k] + I'_m[k] + Z'_m[k],$$

where the ICI $I'_m[k]$ is $$I'_m[k] = C_m^*[0] H_m^*[k-1] X_m^*[k-1] I_m[k] + C_m[0] H_m[k] X_m[k] I_m^*[k-1] + I_m^*[k-1] I_m[k], \tag{13}$$

and the noise $Z'_m[k]$ is $$Z'_m[k] = Y_m^*[k-1] Z_m[k] + Y_m[k] Z_m^*[k-1] - Z_m^*[k-1] Z_m[k]. \tag{14}$$

Thus, the signal $H_m^*[k-1] H_m[k] X_m^*[k-1] X_m[k]$ is reduced by $|C_m[0]|^2$ and corrupted by the ICI $I'_m[k]$ and the noise $Z'_m[k]$, but the frequency offset does not introduce any phase change in the desired signal.

It is assumed that the adjacent subcarriers have the same channel response, i.e., $H_m[k-1] = H_m[k]$ for all k, in order to focus on the effect of the CFO. With the assumption that $H_m[k-1] = H_m[k]$ for all k, the channel becomes a flat-fading channel and can be represented as:

$$h_m[n] = \begin{cases} h_m & \text{for } n = 0 \\ 0 & \text{otherwise} \end{cases} \tag{15}$$

and $$H_m[k] = h_m \text{ for all } k. \tag{16}$$

The power of the desired signal is $$E\left[||C_m[0]|^2 H_m^*[k-1] H_m[k] X_m^*[k-1] X_m[k]|^2\right] \stackrel{(a)}{=} \tag{17}$$
$$|C_m[0]|^4 E[|h_m|^4] E[|X_m^*[k-1] X_m[k]|^2] = |C_m[0]|^4 E[|h_m|^4] \sigma_X^4$$

where (a) follows from the fact that the channel is independent of the transmit symbol. By defining $P_h \triangleq \sqrt{E[|h_m|]}$ and $$f_N(\varepsilon) \triangleq |C_m[0]| = \frac{\sin(\pi\varepsilon)}{N \sin(\pi\varepsilon/N)}, \tag{18}$$

the power of the desired signal can be expressed as $$E\left[||C_m[0]|^2 H_m^*[k-1] H_m[k] X_m^*[k-1] X_m[k]|^2\right] = f_N^4(\varepsilon) P_h^2 \sigma_X^4. \tag{19}$$

Both the ICI and the noise are zero-mean and are independent from each other because the noise is independent from the channel and the transmit symbols. Thus, the power of the ICI-plus-noise signal $I'_m[k] + Z'_m[k]$ is given as $$E[|I'_m[k] + Z'_m[k]|^2] = \sigma_{I'}^2 + \sigma_{Z'}^2, \tag{20}$$

where $\sigma_{I'}^2$ and $\sigma_{Z'}^2$ are the variance of $I'_m[k]$ and $Z'_m[k]$, respectively. The power of the ICI can be calculated by subtracting the power of the desired signal and the power of the noise from the power of the received signal, since the ICI is uncorrelated with the desired signal and the noise. Thus, the ICI power can be expressed as:

$$\sigma_r^2 = E[|Y_m^*[k-1]Y_m[k] - Z'_m[k]|^2] - f_N^4(\varepsilon)P_h^2\sigma_X^4. \quad (21)$$

As will be described below, the ICI power is shown to be equal to $$\sigma_I^2 = [1 - a_N(1 - \cos(2\pi\varepsilon)) - f_N^4(\varepsilon)]P_h^2\sigma_X^4, \quad (22)$$

where $$a_N = -\frac{2}{N^3}\sum_{k=0}^{N-1}k(N-k)\cos\left(\frac{2\pi k}{N}\right). \quad (23)$$

From (14), the noise variance is $$\sigma_{Z'}^2 = 2\sigma_X^2\sigma_Z^2 + \sigma_Z^4. \quad (24)$$

Thus, from (19), (20), (22), and (24), the SNR for frequency-domain differential demodulation is $$SNR(\varepsilon) = \frac{f_N^4(\varepsilon)P_h\sigma_X^2}{[1 - a_N(1 - \cos(2\pi\varepsilon)) - f_N^4(\varepsilon)]P_h\sigma_X^2 + 2\sigma_Z^2 + \frac{\sigma_Z^4}{P_h\sigma_X^2}}. \quad (25)$$

The SNR depends on the number of subcarriers, N, since $f_N(\varepsilon)$ and $\alpha_N$ depends on N. As N increases to infinity, the SNR converges to $$SNR(\varepsilon) = \frac{sinc^4(\varepsilon)P_h\sigma_X^2}{\left(1 - \frac{1 - \cos(2\pi\varepsilon)}{\pi^2} - sinc^4(\varepsilon)\right)P_h\sigma_X^2 + 2\sigma_Z^2 + \frac{\sigma_Z^4}{P_h\sigma_X^2}}, \quad (26)$$

because $f_N(\varepsilon)$ converges to $sinc(\varepsilon)$ and $\alpha_N$ converges to $$\frac{1}{\pi^2}$$

as is shown below:

$$\lim_{N\to\infty}a_N = \lim_{N\to\infty}-\frac{2}{N}\sum_{k=0}^{N-1}\frac{k}{N}\left(1-\frac{k}{N}\right)\cos\left(\frac{2\pi k}{N}\right) = \quad (27)$$

$$\int_0^1 -2x(1-x)\cos(2\pi x)\,dx = \frac{1}{\pi^2},$$

where the integral is easily calculated by the method of integration by parts (Integration by parts: $\int uv' = uv - \int u'v$). $\alpha_N$ can be approximated as $$\frac{1}{\pi^2}$$

for $N \geq 64$ with less than 0.1% error. Similarly, $f_N(\varepsilon)$ can be approximated as $sinc(\varepsilon)$ for $N \geq 64$ with less than 0.01% error. Thus, the SNR does not depend on the number of subcarriers much as long as $N \geq 64$, and (26) can be used to determine the SNR with sufficient accuracy for $N \geq 64$.

The SNR degradation $D(\varepsilon)$ due to the frequency offset $\epsilon$ is $$D(\varepsilon) \triangleq \frac{SNR(0)}{SNR(\varepsilon)} = \frac{1 + [1 - a_N(1 - \cos(2\pi\varepsilon)) - f_N^4(\varepsilon)]\frac{P_h\sigma_X^2}{2\sigma_Z^2}}{f_N^4(\varepsilon)} \quad (28)$$

for $$\frac{\sigma_X^2 P_h}{\sigma_Z^2} \gg 1.$$

The SNR degradation can be approximated using the Taylor series expansion $$D(\varepsilon) \approx D(0) + D'(0)\varepsilon + \frac{1}{2}D''(0)\varepsilon^2 \text{ for } |\varepsilon| \ll 1:$$

$$D(\varepsilon) \approx 1 + \left(1 - \frac{3}{\pi^2}\right)\frac{\pi^2}{3}\frac{P_h\sigma_X^2}{\sigma_Z^2}\varepsilon^2, \quad (29)$$

for $N \geq 16$. When $$|\varepsilon| \ll \sqrt{\frac{3\sigma_Z^2}{\pi^2 P_h\sigma_X^2}},$$

the SNR degradation in dB is approximated as $$D_{dB}(\varepsilon) \approx \left(1 - \frac{3}{\pi^2}\right)\frac{10}{\ln 10}\frac{\pi^2}{3}\frac{P_h\sigma_X^2}{\sigma_Z^2}\varepsilon^2. \quad (30)$$

The Table set forth below summarizes the effect of the CFO on the SNR for coherent demodulation and frequency-domain differential demodulation. As can be seen from the expression of the SNR, frequency-domain differential demodulation has approximately 3 dB lower SNR than coherent demodulation in the absence of the carrier frequency offset.

However, the SNR degradation of frequency-domain differential demodulation is less than twice the SNR degradation of coherent demodulation when the frequency offset $\epsilon$ is small. This fact can also be seen from the SNR expression because $f_N^2(\varepsilon) \approx 1$ and $1 - f_N^4(\varepsilon) \approx 2(1 - f_N^2(\varepsilon))$. If $\alpha_N(1 - \cos(2\pi\varepsilon))$ did not exist, the SNR of differential demodulation for small $\epsilon$ would be half of the SNR of coherent demodulation in the presence of the small frequency offset. However, $\alpha_N(1 - \cos(2\pi\varepsilon))$ reduces the power of the ICI in differential demodulation, resulting in SNR degradation that is less than twice of the SNR degradation of coherent demodulation.

TABLE 1

| | SNR with no frequency offset $SNR_0$ | SNR with frequency offset $\epsilon$ $SNR(\epsilon)$ | SNR Degradation (dB) for small $\epsilon$ and large $SNR_0$ |
|---|---|---|---|
| Coherent | $\dfrac{E[|h_m|^2]\sigma_X^2}{\sigma_Z^2}$ | $\dfrac{f_N^2(\varepsilon)SNR_0}{(1-f_N^2(\varepsilon))SNR_0+1}$ | $\dfrac{10}{\ln 10}\dfrac{\pi^2}{3}\left(1-\dfrac{1}{N^2}\right)SNR_0\varepsilon^2$ |
| FDDD | $\dfrac{E[|h_m|^4]\sigma_X^4}{\sqrt[2]{E[|h_m|^4\sigma_X^2\sigma_Z^2+\sigma_Z^4}}$ | $\dfrac{f_N^4(\varepsilon)SNR_0}{[1-\alpha_N(1-\cos(2\pi\varepsilon))-f_N^4(\varepsilon)]SNR_0+1}$ | $\dfrac{10}{\ln 10}\dfrac{2\pi^2}{3}\left(1-\dfrac{1}{N^2}-3\alpha_N\right)SNR_0\varepsilon^2$ |

For the AWGN channel, a SER expression can be found by approximating the ICI-plus-noise signal $I'_m[k]+Z'_m[k]$ as a zero-mean Gaussian random variable with variance $\sigma_{I'}^2+\sigma_{Z'}^2$. The SER for binary differential phase shift keying (BDPSK) is:

$$P_e = Q(\sqrt{SNR}), \quad (31)$$

whereas the SER for M-ary differential phase shift keying (MDPSK) for $M \geq 4$ is $$P_e = 2Q\left(\sqrt{2\sin^2\left(\frac{\pi}{M}\right)SNR}\right). \quad (32)$$

where SNR is given by (25). However, for small constellation sizes such as $M \leq 4$, the SNR should be adjusted to obtain the accurate SER. Although differential PSK suffers from 3 dB loss in SNR compared to coherent PSK for M>4, the SNR loss for four-phase DPSK is approximately 2.3 dB, and the SNR loss for binary DSPK varies from less than 1 dB to 2 dB depending on the SNR. Thus, the SNR in (25) should be increased by 0.7 dB for four-phase DPSK and 1 dB to 2 dB for BDPSK before putting it in (32) and (31), respectively, since (25) assumes 3 dB loss.

For a flat-fading channel, the average SER for BDPSK can be calculated as $$P_e = \int_0^\infty Q(\sqrt{SNR})p_{|h|^4}(\alpha)d\alpha, \quad (33)$$

where SNR is the same as (25) with $P_h$ replaced by $\sqrt{\alpha}$, and $p_{|h|^2}(\alpha)$ is the probability density function of $|h|^2$. The average SER for MDPSK can be calculated in a similar way.

Referring now to FIG. 10, since the SNR degradation expression in the Table located above is approximate and is valid for small frequency offsets, the exact SNR degradation values are plotted as a function of the frequency offsets $\epsilon$ for $0 \leq \epsilon \leq 0.5$ for AWGN channels. For comparison, the SNR degradation for coherent demodulation is also presented. For both demodulation schemes, the SNR degradation increases as the CFO increases. Moreover, CFO causes higher SNR degradation to the systems operating at high SNR than at low SNR. Frequency-domain differential demodulation is less immune to the CFO than coherent demodulation for a given $SNR_0$.

Referring now to FIG. 11, since the CFO has different effects on SNR for different nominal SNR, the frequency offset value $\epsilon^*$ that causes a given SNR degradation is plotted as a function of nominal SNR for AWGN channels. As is expected, n* decreases as the nominal SNR increases in both demodulation schemes. However, $\epsilon^*$ is smaller for the case of frequency-domain differential demodulation than coherent demodulation. Therefore, it can be concluded that the frequency synchronization requirement of differential demodulation is more stringent than that of coherent demodulation.

Referring now to FIG. 12, the SER is shown in the presence of the frequency offset for frequency-domain differential demodulation and four-phase DPSK. The number of subcarriers, N, is chosen to be 64. The lines were calculated using the theoretical expression (32), while the discrete points were found by simulation. As can be seen in FIG. 12, the simulation results agree well with the results obtained by evaluating the theoretical expression even when the number of subcarriers, N, is only 64. Since the frequency offset has a more adverse effect at low target SERs, the frequency offset correction should be more accurate for low target SERs than for high target SERs.

The foregoing describes the effect of the CFO on frequency-domain differential demodulation in OFDM systems. The exact SNR expression as a function of the CFO was derived, and it was used to calculate the SNR degradation due to the frequency offset. The exact SNR expression was also used to compute the SER under the assumption that the ICI-plus-noise signal is Gaussian. The effect of the CFO on frequency-domain differential demodulation was compared to that of coherent demodulation. The SNR degradation was found to increase as the nominal SNR increases, similar to the case of coherent demodulation. However, compared to coherent demodulation, the frequency-domain differential demodulation was shown to be less immune to the CFO.

The following is a derivation of the ICI Power $\sigma_{I'}^2$. To simplify the notation, the OFDM symbol index m is omitted. As previously stated, the variance of the ICI can be expressed as:

$$\sigma_{I'}^2 = E[|Y^*[k-1]Y[k]-Z'[k]|^2] - f_N^4(\epsilon)\sigma_X^4. \quad (34)$$

The first term of the right-hand side can be expressed as follows:

$$E[|Y^*[k-1]Y[k]-Z'[k]|^2] = \quad (35)$$

$$P_h^2 \cdot \sum_{q=0}^{N-1}\sum_{r=0}^{N-1}\sum_{s=0}^{N-1}\sum_{t=0}^{N-1} C[q]C^*[r]C^*[s]C[t] \cdot$$

$$E[X[k-q]X^*[k-r-1]X^*[k-s]$$

$$X[k-t-1]] = P_h^2\sigma_X^4\left(\sum_{q=0}^{N-1}\sum_{r=0}^{N-1}|C[q]C[r]|^2 + \right.$$

$$\sum_{q=0}^{N-1}\sum_{s=0}^{N-1}C[q]C^*[q-1]C^*[s]C[s-1] -$$

$$\left.\sum_{q=0}^{N-1}|C[q]C^*[q-1]|^2\right),$$

where the following fact was used:

$$E[X[k-q]X^*[k-r-1]X^*[k-s]X[k-t-1]] = \qquad (36)$$
$$(\delta[q-s]\delta[r-t] + \delta[q-r-1]\delta[s-t-1] -$$
$$\delta[q-s]\delta[r-t]\delta[s-t-1])\sigma_X^4.$$

The first term of (35) is equal to 1, since $$\sum_{q=0}^{N-1}\sum_{r=0}^{N-1}|C[q]C[r]|^2 = \sum_{q=0}^{N-1}|C[q]|^2 \sum_{r=0}^{N-1}|C[r]|^2 = 1, \qquad (37)$$

whereas the second term of (35) is equal to 0, because $$\sum_{q=0}^{N-1} C[q]C^*[q-1] = \frac{1}{N^2}\sum_{q=0}^{N-1}\sum_{n=0}^{N-1}\sum_{m=0}^{N-1} e^{j2\pi(\varepsilon-q)n/N}e^{-j2\pi(\varepsilon-q+1)m/N} = \qquad (38)$$
$$\frac{1}{N^2}\sum_{m=0}^{N-1} e^{-j\frac{2\pi m}{N}}\sum_{n=0}^{N-1} e^{j\frac{2\pi\varepsilon(n-m)}{N}}\sum_{q=0}^{N-1} e^{-j\frac{2\pi q(n-m)}{N}} =$$
$$\frac{1}{N^2}\sum_{m=0}^{N-1} e^{-j\frac{2\pi m}{N}}\sum_{n=0}^{N-1} e^{j\frac{2\pi\varepsilon(n-m)}{N}} N\delta[n-m] = \frac{1}{N}\sum_{m=0}^{N-1} e^{-j\frac{2\pi m}{N}} = 0.$$

Finally, as will be shown below, the third term can be expressed as:

$$\sum_{q=0}^{N-1} |C[q]C^*[q-1]|^2 = a_N(1-\cos(2\pi\varepsilon)), \qquad (39)$$

where $$a_N = -\frac{2}{N^3}\sum_{k=0}^{N-1} k(N-k)\cos\left(\frac{2\pi k}{N}\right). \qquad (40)$$

Thus, (35) can be simplified to $$E[|Y^*[k-1]Y[k] - Z'[k]|^2] = [1 - a_N(1-\cos(2\pi\varepsilon))]P_h^2\sigma_X^4 \qquad (41)$$

By substituting (41) into (34), the variance of the ICI is obtained:

$$\sigma_I^2 = [1 - \alpha_N(1-\cos(2\pi\epsilon)) - f_{N4}(\epsilon)]P_h^2\sigma_X^4 \qquad (42)$$

The proof of is as follows:

$$\sum_{q=0}^{N-1} |C[q]C^*[q-1]|^2 = \frac{1}{N^4} \qquad (43)$$
$$\sum_{n=0}^{N-1}\sum_{m=0}^{N-1}\sum_{s=0}^{N-1}\sum_{t=0}^{N-1} e^{j\frac{2\pi\varepsilon(n-s-m+t)}{N}} e^{-j\frac{2\pi(m-t)}{N}} \cdot \sum_{q=0}^{N-1} e^{j\frac{2\pi q(m-t+n-s)}{N}}$$

Since $$\sum_{q=0}^{N-1} e^{j\frac{2\pi q(m-t+n-s)}{N}} = \qquad (44)$$
$$\delta[t-m+n-s-N] + \delta[t-m+n-s] + \delta[t-m+n-s+N],$$
$$\sum_{q=0}^{N-1} |C[q]C^*[q-1]|^2 =$$
$$\frac{1}{N^3}\sum_{n=0}^{N-1}\sum_{s=0}^{N-1} e^{-j\frac{2\pi(n-s)}{N}}\{(n-s)^+ e^{j2\pi\varepsilon} + [N - (n-s)^+ - (s-n)^+] +$$
$$(s-n)^+ e^{-j2\pi\varepsilon}\} = \frac{1}{N^3}\sum_{n=0}^{N-1}\sum_{s=0}^{N-1} e^{-j\frac{2\pi(n-s)}{N}}$$
$$\{N - (n-s)^-(1 - e^{j2\pi\varepsilon}) - (s-n)^+(1 - e^{-j2\pi\varepsilon})\},$$

where $$(x)^+ = \begin{cases} x & \text{for } x \geq 0 \\ 0 & \text{otherwise.} \end{cases} \qquad (45)$$

It can be easily seen that $$\sum_{n=0}^{N-1}\sum_{s=0}^{N-1} e^{-j\frac{2\pi(n-s)}{N}} = 0.$$

Thus, $$\sum_{q=0}^{N-1} |C[q]C^*[q-1]|^2 = \qquad (46)$$
$$-\frac{1}{N^3}\sum_{n=0}^{N-1}\sum_{s=0}^{N-1} e^{-j\frac{2\pi(n-s)}{N}}[(n-s)^+(1 - e^{j2\pi\varepsilon}) + (s-n)^+(1 - e^{-j2\pi\varepsilon})] =$$
$$-\frac{1}{N^3}\sum_{n=0}^{N-1}\sum_{s=0}^{N-1} e^{-j\frac{2\pi(n-s)}{N}}[(n-s)^+(1 - \cos(2\pi\varepsilon) - j\sin(2\pi\varepsilon)) +$$
$$(s-n)^+(1 - \cos(2\pi\varepsilon) + j\sin(2\pi\varepsilon))] =$$
$$-\frac{1}{N^3}\sum_{n=0}^{N-1}\sum_{s=0}^{N-1} e^{-j\frac{2\pi(n-s)}{N}}|n-s|(1 - \cos(2\pi\varepsilon)) = a_N(1 - \cos(2\pi\varepsilon)),$$

where $$a_N = -\frac{1}{N^3}\sum_{n=0}^{N-1}\sum_{s=0}^{N-1} e^{-j\frac{2\pi(n-s)}{N}}|n-s|. \qquad (47)$$

By manipulating the above equation, it can be shown that $$a_N = -\frac{1}{N^3}\left[\sum_{k=0}^{N-1} k(N-k)e^{j\frac{2\pi k}{N}} + \sum_{k=0}^{N-1} k(N-k)e^{-j\frac{2\pi k}{N}}\right] \qquad (48)$$
$$= -\frac{2}{N^3}\sum_{k=0}^{N-1} k(N-k)\cos\left(\frac{2\pi k}{N}\right).$$

The SNR derived above can be used to estimate the CFO at the receiver. Exact and closed-form expressions are derived for the SNR in the presence of a CFO for FDDD systems In practical communication systems, the receiver SNR can often be measured or estimated. The present invention uses these measured, estimated, and/or calculated SNR values at the receiver to estimate the CFO using the SNR expressions derived above.

If the nominal SNR without carrier frequency offset, $SNR_0$, is large, $$SNR(\varepsilon) \approx \frac{f_N^4(\varepsilon)}{[1 - a_N(1 - \cos(2\pi\varepsilon)) - f_N^4(\varepsilon)]}, \quad (49)$$

where $f_n(\varepsilon)$ is defined in (18). That is given the SNR measured/estimated at the receiver, $SNR_m$, the carrier frequency offset, $\varepsilon$, can be estimated using the Equation (49). This computation can be implemented using, for example, a look-up table with the input as $SNR_m$ and the output as the estimated carrier frequency offset $\varepsilon$. The size of the table depends on the precision of the estimation required. Alternately, a direct computation can be made or another approach can be used.

Section 3

Effect of CFO on Time-Domain Differential Demodulation

The present invention analyzes the effect of the CFO on time-domain differential demodulation (TDDD) in orthogonal frequency division multiplexing (OFDM) systems. Accurate SNR and SER expressions are derived in the presence of the CFO. Using the SNR expression, the SNR degradation due to the CFO is quantified. The effect of the CFO on TDDD is compared with that of coherent demodulation. TDDD is more sensitive to CFO as compared to coherent demodulation. The present invention provides insights into how the CFO affects system performance and can also be used to determine the maximum tolerable frequency offset at given a target SER.

The effect of the CFO on TDDD in OFDM systems is expressed both in terms of the SNR degradation and the increase in the SER. These two expressions are computed by first deriving and then employing an accurate expression for the SNR in the presence of a CFO. It is assumed that the channel is time-invariant so that the SNR and SER degradation are accurate measures of the effect of the CFO and do not depend on specific channel scenarios.

An OFDM system transmits information as a series of OFDM symbols. Referring back to FIG. 1, the inverse discrete Fourier transform (IDFT) is performed on the information symbols $X_m[k]$ for $k=0,1,\ldots,N-1$ to produce the time-domain samples $x_m[n]$ of the m-th OFDM symbol:

$$x_m[n] = \begin{cases} \frac{1}{N} \sum_{k=0}^{N-1} X_m[k] e^{j2\pi k(n-N_g)/N}, & \text{if } 0 \leq n \leq N + N_g - 1 \\ 0, & \text{otherwise,} \end{cases} \quad (1)$$

where N and $N_g$ are the numbers of data samples and cyclic prefix samples, respectively.

The OFDM symbol $x_m[n]$ is then transmitted through a channel $h_m[n]$ and is corrupted by Gaussian noise $\tilde{z}_m[n]$ with variance $\sigma_{\tilde{z}}^2$. The channel $h_m[n]$ is assumed to be block-stationary, i.e., time-invariant during each OFDM symbol. When the receiver oscillator is not perfectly matched to the transmitter oscillator, there can be a CFO $\Delta f = f_t - f_r$ between the transmitter carrier frequency $f_t$ and the receiver carrier frequency $f_r$. In addition, there may be a phase offset $\theta_0$ between the transmitter and the receiver carrier. The received symbol $y_m[n]$ is then $$y_m[n] = e^{j[2\pi\Delta f(n+m(N+N_g))T + \theta_0]}(h_m[n]*x_m[n] + \tilde{z}_m[n]) \quad (2)$$

where T is the sampling period, and * denotes the convolution operation, i.e., $h_m[n]*x_m[n] = \sum_{r=-\infty}^{\infty} h_m[r]x_m[n-r]$.

The frequency offset $\Delta f$ can be represented with respect to the subcarrier bandwidth $1/NT$ by defining the relative frequency offset $\varepsilon$ as $$\varepsilon \triangleq \frac{\Delta f}{1/NT} = \Delta f NT. \quad (3)$$

Using the relative frequency offset $\varepsilon$, the received symbol $y_m[n]$ is expressed as $$y_m[n] = Nc_m[n](h_m[n]*x_m[n]) + z_m[n], \quad (4)$$

where $$c_m[n]\frac{1}{N} e^{j2\pi\varepsilon n/N} e^{j2\pi\varepsilon m(1+\alpha)} e^{j\theta_0},$$

$$z_m[n] = e^{j\frac{2\pi\varepsilon n}{N}} e^{j2\pi\varepsilon m(1+\alpha)} e^{j\theta_0} \tilde{z}_m[n],$$

and $$\alpha = \frac{N_z}{N}.$$

The noise $z_m[n]$ is a zero-mean complex-Gaussian random-variable with variance $$\sigma_Z^2 = \sigma_{\tilde{Z}}^2$$

and is independent of the transmit signal and the channel.

The relative frequency offset $\varepsilon$ can be divided into an integer part $l$ and a non-integer part $\tilde{\varepsilon}$ such that $-\frac{1}{2} \leq \tilde{\varepsilon} < \frac{1}{2}$:

$$\varepsilon = l + \tilde{\varepsilon}. \quad (5)$$

Then the discrete Fourier transform (DFT) of $y_m[n]$ in the presence of the carrier frequency offset $\varepsilon = l + \tilde{\varepsilon}$ is $$Y_m[k] = C_m[l]H_m[k-l]X_m[k-l] + I_m[k] + Z_m[k], \quad (6)$$

where $$I_m[k] = \sum_{r \neq l} C_m[r] H_m[k-r] X_m[k-r], \quad (7)$$

and $C_m[k]$, $H_m[k]$, and $Z_m[k]$ are the DFTs of $c_m[n]$, $h_m[n]$, and $z_m[n]$. In the above, $H_m[k]$ and $X_m[k]$ are assumed to be periodic with period N for the simplicity of the notation. From the definition of the DFT, the following can be derived:

$$C_m[k] = \left(\frac{\sin(\pi(\varepsilon-k))}{N\sin(\pi(\varepsilon-k)/N)}e^{j\pi(\varepsilon-k)(1-1/N)}\right)\cdot e^{j[2\pi\varepsilon m(1+\alpha)+\theta_0]}. \qquad (8)$$

It can be seen from (6) that the integer frequency offset l causes the cyclic shift of the subcarriers, whereas the residual frequency offset $\bar{\varepsilon}$ reduces the desired signal and introduces ICI, resulting in SNR degradation. It is assumed herein that the integer frequency offset l is zero for the sake of simplicity since l does not affect the SNR and SER analysis.

The effect of the frequency offset on the SNR and SER of differential phase-shift-keying (DPSK) modulation in OFDM systems will be described below. The decision metric $M_m[k]$ for time-domain differential demodulation is:

$$M_m[k] = Y^*_{m-1}[k]Y_m[k] = \qquad (9)$$
$$e^{j2\pi\varepsilon(1+\alpha)}|C^*_{m-1}[0]C_m[0]|H^*_{m-1}[k]H_m[k]\cdot X^*_{m-1}[k]X_m[k] +$$
$$I_m[k] + Z_m[k].$$

where the ICI $I_m[k]$ is:

$$I_m[k] = C^*_{m-1}[0]H^*_{m-1}[k]X^*_{m-1}[k]I_m[k] + C_m[0]H_m[k]X_m[k]I^*_{m-1}[k] + I^*_{m-1}[k]I_m[k], \qquad (10)$$

and the noise $Z_m[k]$ is:

$$Z_m[k] = (Y_{m-1}[k] - Z_{m-1}[k])^*Z_m[k] + (Y_m[k] - Z_m[k])Z^*_{m-1} + Z^*_{m-1}[k]Z_m[k]. \qquad (11)$$

Here, the desired signal, the ICI, and the noise are zero-mean and uncorrelated with one another when the data symbols in each subcarrier are zero-mean and uncorrelated with the data in the other subcarriers.

The multiplication factor, $C^*_{m-1}[0]C_m[0]$ of the signal $H^*_{m-1}[k]H_m[k]X^*_{m-1}[k]X_m[k]$ in (9) has the nonzero phase of $2\pi\varepsilon(1-\alpha)$ as can be seen from (8). This phase difference results from the accumulation of the frequency offset over one OFDM symbol. This shows that the signal $H^*_{m-1}[k]H_m[k]X^*_{m-1}[k]X_m[k]$ is attenuated by $|C^*_{m-1}[0]C_m[0]|$ and corrupted by the ICI $I_m[k]$ and the noise $Z'_m[k]$. Furthermore, the phase of $H^*_{m-1}[k]H_m[k]X^*_{m-1}[k]X_m[k]$ is rotated by $e^{j2\pi\varepsilon(1+\alpha)}$, which may result in high probability of errors.

It is assumed that the channel response at a given subcarrier does not change, i.e., $H_{m-1}[k] = H_m[k]$ for all m, in order to focus on the effect of the frequency offset. With the assumption that $H_{m-1}[k] = H_m[k]$ for all k, the channel becomes a time-invariant frequency selective channel, and the OFDM symbol index m can be dropped.

$$H_m[k] = H[k] \text{ for all } m. \qquad (12)$$

The effect of the frequency offset on the SNR will be described further below. The power of the desired signal in (9) is $$E[||C_m[0]|^2 H^*[k]H[k]X^*_{m-1}[k]X_m[k]|^2] = \qquad (13)$$
$$|C_m[0]|^4|H[k]|^4 E[|X^*_{m-1}[k]X_m[k]|^2] = |C[0]|^4|H[k]|^4\sigma_X^4,$$

where $|C[0]| = |C_m[0]|$ since the magnitude of $C_m[0]$ does not depend on the OFDM symbol index m.

The power of the ICI-plus-noise signal is equal to $$E[|I_m[k] + Z_m[k]|^2] = E[|I_m[k]|^2] + E[|Z_m[k]|^2] \qquad (14)$$

because the noise and the ICI are zero-mean and the noise is uncorrelated with the ICI. Since the ICI is uncorrelated with the desired signal, the power of the ICI can be calculated as follows:

$$E[|I_m[k]|^2] = E[|Y^*_m[k-1]Y_m[k] - Z_m[k]|^2] - |C[0]H[k]|^4\sigma_X^4. \qquad (15)$$

With the assumption that $E[X^*_{m-1}[q]X_{m-1}[r]X_m[s]X^*_m[t]] = \delta[q-r]\delta[s-t]\sigma_X^4$, (15) can also be expressed as:

$$E[|I_m[k]|^2] = \left[\left(\sum_{q=0}^{N-1}|C[q]H[k-q]|^2\right)^2 - |C[0]H[k]|^4\right]\sigma_X^4. \qquad (16)$$

Since the noise $Z_m[k]$ is zero-mean, the noise power is $$E[|Z_m[k]|^2] = 2\sum_{q=0}^{N-1}|C[q]H[k-q]|^2\sigma_X^2\sigma_Z^2 + \sigma_Z^4, \qquad (17)$$

from (11).

Thus, from (13), (14), (16), and (17), the SNR of subcarrier k for time-domain differential demodulation is given as (18). The SNR expression can be simplified if the channel response $H[k]$ has the same fixed value, in which case, the channel becomes the AWGN channel with $H[k]=1$ for all k.

$$SNR[k] = \frac{|C[0]H[k]|^4\sigma_X^4}{\left[\left(\sum_{q=0}^{N-1}|C[q]H[k-q]|^2\right)^2 - |C[0]H[k]|^4\right]\sigma_X^4 + 2\sum_{q=0}^{N-1}|C[q]H[k-q]|^2\sigma_X^2\sigma_Z^2 + \sigma_Z^4}. \qquad (18)$$

For the AWGN channel, the SNR of subcarrier k for all k is equal to $$SNR = \frac{|C[0]|^4\sigma_X^2}{\left[\left(\sum_{q=0}^{N-1}|C[q]|^2\right)^2 - |C[0]|^4\right]\sigma_X^2 + 2\sigma_Z^2 + \frac{\sigma_Z^4}{\sigma_X^2}}. \qquad (19)$$

By noting that $$\sum_{q=0}^{N-1}|C[q]|^2 = N\sum_{n=0}^{N-1}|c_m[n]|^2 = 1, \qquad (20)$$

and defining $$f_N(\varepsilon) = |C[0]| = \left|\frac{\sin(\pi\varepsilon)}{N\sin(\pi\varepsilon/N)}\right|, \qquad (21)$$

the SNR for the AWGN channel is given as $$SNR(\varepsilon) = \frac{f_N^4(\varepsilon)SNR_0}{(1 - f_N^4(\varepsilon))SNR_0 + 1}, \quad (22)$$

where $SNR_0$ is the SNR in the absence of the frequency offset:

$$SNR_0 = \frac{\sigma_X^4}{2\sigma_X^2\sigma_Z^2 + \sigma_Z^4}. \quad (23)$$

The SNR degradation $D(\varepsilon)$ due to the frequency offset $\varepsilon$ can be defined as in coherent demodulation. The expression for the SNR degradation and its approximation for small $\varepsilon$ can be found in Table 2 below.

TABLE 2

| Demodulation Type | Coherent Demodulation | Time-Domain Differential Demodulation |
|---|---|---|
| $SNR_0$ | $\dfrac{\sigma_X^2}{\sigma_Z^2}$ | $\dfrac{\sigma_X^4}{2\sigma_X^2\sigma_Z^2 + \sigma_Z^4}$ |
| $SNR(\varepsilon)$ | $\dfrac{f_N^2(\varepsilon)SNR_0}{(1 - f_N^2(\varepsilon))SNR_0 + 1}$ | $\dfrac{f_N^4(\varepsilon)SNR_0}{(1 - f_N^4(\varepsilon))SNR_0 + 1}$ |
| SNR Degradation | $\dfrac{1 + (1 - f_N^2(\varepsilon))SNR_0}{f_N^2(\varepsilon)}$ | $\dfrac{1 + (1 - f_N^4(\varepsilon))SNR_0}{f_N^4(\varepsilon)}$ |
| SNR Degradation for small $\varepsilon$ | $1 + \dfrac{\pi^2}{3}\left(1 - \dfrac{1}{N^2}\right)(1 + SNR_0)\varepsilon^2$ | $1 + \dfrac{2\pi^2}{3}\left(1 - \dfrac{1}{N^2}\right)(1 + SNR_0)\varepsilon^2$ |
| SNR Degradation (dB) for small $\varepsilon$ | $\dfrac{10}{\ln 10}\dfrac{\pi^2}{3}\left(1 - \dfrac{1}{N^2}\right)(1 + SNR_0)\varepsilon^2$ | $\dfrac{10}{\ln 10}\dfrac{2\pi^2}{3}\left(1 - \dfrac{1}{N^2}\right)(1 + SNR_0)\varepsilon^2$ |
| SER (M = 2) | $Q(\sqrt{SNR})$ | $Q(\sqrt{\cos^2(2\pi\varepsilon(1 + \alpha))SNR})$ |
| SER (M $\geq$ 4) | $2Q\left(\sqrt{2\sin^2\left(\dfrac{\pi}{M}\right)SNR}\right)$ | $Q\left(\sqrt{2\sin^2\left(\dfrac{\pi}{M} + 2\pi\varepsilon(1 + \alpha)\right)SNR}\right) + Q\left(\sqrt{2\sin^2\left(\dfrac{\pi}{M} - 2\pi\varepsilon(1 + \alpha)\right)SNR}\right)$ |

Although the SNR is not affected by the phase rotation of the desired signal, the phase rotation of the desired signal in (9) increases the SER. For binary differential phase shift keying (BDPSK), the phase rotation of $2\pi\varepsilon(1+\alpha)$ changes the real part of the desired signal $|H[k]|^2 X_{m-1}[k]X_m[k]$ from $\pm |H[k]|^2 \sigma_X^2$ to $\pm |H[k]|^2 \sigma_X^2 \cos(2\pi\varepsilon(1+\alpha))$. By approximating the ICI-plus-noise signal $I_m[k]+Z_m[k]$ as a zero-mean Gaussian random variable, the SER of subcarrier k is given as $$P_e[k] = Q(\sqrt{\cos^2(2\pi\varepsilon(1+\alpha))SNR[k]}), \quad (24)$$

where SNR[k] is defined in (18). The above expression is valid as long as $$|2\pi\varepsilon(1+\alpha)| \leq \pi/2, \quad \text{i.e.} |\varepsilon| \leq \varepsilon_{max} = \frac{1}{4(1+\alpha)}.$$

If $|\varepsilon| > \varepsilon_{max}$, then the SER will be greater than ½.

For M-ary differential phase shift keying (MDPSK) with $M \geq 4$, the phase rotation of $2\pi\varepsilon(1+\alpha)$ changes the distance to the decision boundary from $$\sigma_X^2 \sin\left(\frac{\pi}{M}\right)$$

to $$\sigma_X^2 \sin\left(\frac{\pi}{M} pm 2\pi\varepsilon(1 + \alpha)\right)$$

as FIG. 13 shows. Thus, the SER for M-ary differential phase shift keying (MDPSK) becomes $$P_e = Q\left(\sqrt{2\sin^2\left(\frac{\pi}{M} + 2\pi\varepsilon(1 + \alpha)\right)SNR[k]}\right) + Q\left(\sqrt{2\sin^2\left(\frac{\pi}{M} - 2\pi\varepsilon(1 + \alpha)\right)SNR[k]}\right), \quad (25)$$

for $$|\varepsilon| \leq \varepsilon_{max} = \frac{1}{2M(1 + \alpha)}.$$

The SER will be greater than ½ for $|\varepsilon| > \varepsilon_{max}$.

For small constellation sizes such as $M \leq 4$, the SNR should be adjusted to obtain the accurate SER using (18) for (24) and (25). Although differential PSK suffers from 3 dB loss in SNR compared to coherent PSK for M>4, the SNR loss for four-phase DPSK is approximately 2.3 dB, and the SNR loss for binary DSPK varies from less than 1 dB to 2 dB depending on the SNR [10]. Thus, the SNR in (18) should be increased by 0.7 dB for four-phase DPSK and 1 dB to 2 dB for BDPSK before putting it in (25) and (24), respectively, since (18) assumes 3 dB loss.

Table 2 summarizes the effect of the frequency offset on the SNR and SER for coherent demodulation and time-domain differential demodulation for AWGN channels. As can be seen from the expression of the $SNR_0$, time-domain differential demodulation has approximately 3 dB lower SNR than coherent demodulation for the same $\sigma_X^2$ and $\sigma_Z^2$. As can be seen from the SNR degradation expressions in the table, CFO causes larger SNR degradation in TDDD than in coherent demodulation for a given $SNR_0$.

CFO not only affects the SNR more severely in TDDD than in coherent demodulation, but also has much more detrimental effect on TDDD in terms of the SER than coherent demodulation. This fact can be easily seen from the table for M=2 since $\cos^2(2\pi\epsilon(1+\alpha))\leq 1$. For M$\geq$4, the SER of TDDD is larger than that of coherent demodulation for the same SNR. Thus, even if the SNR is chosen to be the same for coherent demodulation and TDDD, the SER of TDDD is larger than the SER of coherent demodulation in the presence of the CFO.

Referring now to FIG. 14, the SNR degradation values for the frequency offset $\epsilon$ with $0\leq\epsilon\leq0.5$ for AWGN channels. For comparison, the SNR degradation for coherent demodulation is also presented. For both coherent demodulation and TDDD schemes, the SNR degradation increases as the frequency offset increases. Moreover, frequency offset causes higher SNR degradation to the systems operating at high SNR than at low SNR. However, the SNR degradation of differential demodulation increases faster compared to coherent demodulation as the frequency offset increases. Thus, TDDD suffers more from the frequency offset than the coherent demodulation. As expected from FIG. 14, $\epsilon^*$ decreases as the nominal SNR increases in both demodulation schemes. However, $\epsilon^*$ is larger for the case of coherent demodulation than TDDD.

Referring now to FIGS. 15 and 16, the SER for the coherent demodulation and TDDD are shown. FIG. 15 is for four-phase PSK and DPSK, whereas FIG. 16 is for eight-phase PSK and DPSK. The number of subcarriers, N, was chosen to be 64, and the number of constellation points in each subcarrier is four. The lines were calculated using the theoretical expressions in the Table 2 in this section, while the discrete points were found by simulation. As can be seen in both FIGS., the simulation results agree well with the results obtained by evaluating the theoretical expression even when the number of subcarriers, N, is only 64.

FIGS. 15 and 16 also show that the frequency offset has a larger impact at low target SER. Thus, the frequency offset correction should be more accurate for the low target SER than for the high target SER. Moreover, a given frequency offset exerts more adverse effects on TDDD because of the phase rotation compared to coherent demodulation. Thus, the frequency synchronization requirement for TDDD is more strict than that for coherent detection.

By comparing FIG. 16 with FIG. 15, it can be seen that CFO has a more detrimental effect on eight-phase DPSK than four-phase DPSK for the case of TDDD. This can be explained by the fact that a given frequency offset rotates the signal constellation with the same degree regardless of the number of signal constellation points.

The effect of the CFO on TDDD was analyzed in OFDM systems. An accurate SNR expression was derived as a function of the carrier frequency offset, and accurate SER expressions were also derived under the assumption that the ICI-plus-noise signal is Gaussian. The effect of the CFO on TDDD was then compared to that of coherent demodulation.

The SNR degradation was found to increase as the nominal SNR increases, similar to the case of coherent demodulation. However, the SNR degradation due to frequency offset for time-domain differential modulation is larger than that for coherent demodulation. In terms of SER, TDDD suffers from the CFO greatly. In other words, the frequency offset not only reduces the SNR, but also rotates the signal constellation points as shown in FIG. 13. The rotation of the signal constellation points in TDDD results in much higher SER compared to coherent demodulation. Therefore, an accurate synchronization algorithm should be employed for time-domain differential demodulation.

Section 4

CFO Estimation

Referring now to FIG. 17, a device 100A includes a transmitter 104A and a receiver 108A. The device 100A sends data to the transmitter 104A, which generates transmitter signals using OFDM. The receiver 108A includes a receiver functions module 112A, which receives receiver signals and employs OFDM. The receiver functions module 112A communicates with an SNR estimator module 116A that estimates SNR of the receiver signals. The SNR estimator module 116A outputs the SNR estimate to a CFO estimator module 120A.

The CFO estimator module 120A estimates the CFO based upon the SNR estimate and generates a CFO estimate for the receiver functions module 112A. The receiver functions module 112A may adjust operating parameters of the receiver based on the estimated CFO and/or otherwise may use the CFO estimate to perform other functions. A second device 100B includes similar components as the device 100A. The similar components are labeled with the suffix "B" instead of "A" in FIG. 10.

Using coherent demodulation, the SNR expression that includes the effect of the carrier frequency offset, SNR($\epsilon$), is given in (29) in Section 1. If the nominal SNR without carrier frequency offset, $SNR_0$, is large, $$SNR(\varepsilon) \approx \frac{f_N^2(\varepsilon)}{1 - f_N^2(\varepsilon)}, \quad (1)$$

where $f_N(\epsilon)$ is defined in (30) in Section 1. That is, given the SNR measured/estimated at the receiver, $SNR_m$, the carrier frequency offset, $\epsilon$, can be estimated by the CFO estimator using (1) of Section 4.

In frequency-domain differential demodulation, the SNR expression that includes the effect of the carrier frequency offset, SNR($\epsilon$), is given in Section 2 above. If the nominal SNR without carrier frequency offset, $SNR_0$, is large, $$SNR(\varepsilon) \approx \frac{f_N^4(\varepsilon)}{[1 - a_N(1 - \cos[2\pi\varepsilon)) - f_N^4(\varepsilon)]}, \quad (2)$$

That is, given the SNR measured/estimated at the receiver, $SNR_m$, the carrier frequency offset, $\epsilon$, can be estimated by the CFO estimator using (2) of Section 4.

In time-domain differential demodulation, the SNR expression that includes the effect of the carrier frequency offset, SNR($\epsilon$) is given in Section 3. If the nominal SNR without carrier frequency offset, $SNR_0$, is large, $$SNR(\varepsilon) \approx \frac{f_N^4(\varepsilon)}{1 - f_N^4(\varepsilon)}. \quad (3)$$

where $f_N(\epsilon)$ is defined in Section 3. That is, given the SNR measured/estimated at the receiver, $SNR_m$, the carrier frequency offset, $\epsilon$, can be estimated by the CFO estimator using (3) of Section 4.

The CFO estimator module 120 may calculate the CFO estimate. Alternately, the computation can be implemented using, for example, a look-up table with the input as $SNR_m$ and the output as the estimated carrier frequency offset $\epsilon$. The size of the table can be adjusted depending upon the desired precision for the CFO estimate.

Referring now to FIG. 18, a method according to the present invention for generating a CFO estimate based on a SNR estimate is shown. Control begins in step 150. In step 152, control determines whether the receiver is enabled. If false, control loops back to step 152. Otherwise, the receiver receives the OFDM signal in step 154. In step 158, a SNR value is calculated, estimated, looked up or otherwise generated as described above. In step 162, the CFO is calculated, estimated, looked up or otherwise generated as a function of the SNR value. In step 164, the CFO is output to the receiver and/or transmitter modules.

Section 5

Adaptive Receiver with Adjustable CFO Estimation/Correction Algorithm

Adaptive reception can optimize the performance of a system operating in changing channel conditions. An adaptive reception system according to the present invention considers the residual CFO that is allowed in a system as an adaptive parameter in order to achieve a target system performance while minimizing the complexity, power consumption and/or delay of the system.

Referring now to FIG. 19, a transceiver 200 according to the present invention is shown to include a transmitter 204 and an adaptive receiver 208. The transmitter 204 receives data, performs coding, multiplexing and/or other transmitter functions and outputs the data to a communications channel as shown. The adaptive receiver 208 includes a receiver functions module 212 that performs receiver functions such as decoding, demultiplexing and other receiver functions and outputs received data as shown.

A CFO estimation/correction module 216 communicates with the receiver functions module 212. The CFO estimation/correction module estimates and corrects CFO. In some embodiments, the CFO estimate/correction is generated as described in Section 4. An operating parameters module 220 communicates with the receiver functions module 212 and the CFO estimation/correction module 216. There are a variety of other CFO algorithms in addition to those described above that can estimate/correct the CFO with varying levels of precision. As precision increases, however, the algorithms generally become more complex to implement, dissipate more power and/or cause more delay in a system.

The operating parameters monitoring module 220 monitors one or more operating parameters of the received data such as SNR, SER, modulation type, coding rate, and/or BER. The operating parameters monitoring module 220 also monitors the CFO. The operating parameters monitoring module 220 selects between two or more CFO estimation/correction algorithms and/or adjusts one or more parameters of the CFO correction algorithm(s) to minimize power consumption, delay and/or complexity of the CFO estimation/correction algorithm. As can be appreciated, while the CFO estimation/correction algorithm is being described as one algorithm, the estimation algorithm may be adjusted independently from the correction algorithm and/or the correction algorithm may be adjusted independently from the estimation algorithm.

In some embodiments, the CFO correction described in U.S. patent application Ser. No. 10/985,860, filed Nov. 10, 2004 is performed, which is hereby incorporated by reference. As disclosed therein, a fine frequency offset correction algorithm for time-domain differential demodulation OFDM systems in frequency-selective channels is described. By introducing extra complexity, the residual CFO in a system can be reduced. For the most commonly used maximum likelihood (ML) techniques for frequency offset estimation, the CFO may be estimated more precisely and thus the residual CFO can be reduced by averaging over more (or X) observed symbols. However, more averaging (as X increases) can result in higher computation complexity and may translate into more power consumption in the receiver. Furthermore, by averaging over more symbols, a receiver may also incur more delay.

In Sections 1-3, the performance of OFDM systems in the presence of CFO for coherent and differential demodulation systems was described. The CFO can reduce the SNR, BER, and/or SER performance of a system. The degradation is dependent on parameters such as the modulation scheme used in the system and its operating SNR. Thus, depending on the channel condition, the system configuration and the target performance, different CFO estimation/correction algorithms of different complexity may be required. The operating parameters monitoring module 220 selects and adjusts the CFO estimation/correction algorithm based on these considerations.

In Section 1, the SNR degradation due to the CFO was shown to increase as the frequency offset increased. Furthermore, the CFO causes more degradation to a system operating at high SNR values than a system operating at low SNR values. For example, FIG. 6 shows the SNR degradation given the value of the CFO, for no CFO, $\epsilon$=0.1 and $\epsilon$=0.2. For the same target SER, if a system can operate at a higher SNR it can usually tolerate a higher CFO. Thus, a relatively more simple CFO estimation/correction algorithm may be employed to reduce complexity, power consumption and/or delay in the receiver. While the example given above is based on coherent demodulation OFDM systems, the adaptive CFO concept can be easily extended to other systems once the effect of the CFO on the system performance is characterized.

Referring now to FIG. 20, steps that are performed by the adaptive receiver 208 according to the present invention is shown. In step 250, control begins. In step 252, control determines whether the receiver is enabled. In step 254, the operating parameters monitoring module 220 monitors one or more receiver operating parameters. In step 256, the operating parameters monitoring module selectively adjusts the estimation/correction algorithm and/or parameters thereof based on selected criteria. In step 258, the CFO estimation/correction module generates CFO estimation/correction. For example, given a fixed SER, a receiver may be able to tolerate a higher SNR than is currently being received. Thus, the complexity of the CFO estimation/correction algorithm and/or parameters thereof may be adjusted to reduce delay, complexity and/or power consumption as shown in step 266. Alternately, the SNR may rise above a tolerable level or within a threshold of the tolerable level and the complexity of the CFO estimation/correction algorithm can be adjusted to improve the SNR. In some situations, the complexity of the algorithm can be Still other variations will be apparent to skilled artisans.

Section 6

Adaptive Transmitter Based on CFO

As was described above in Section 5, adaptive transmission can optimize the performance of a system operating in changing channel conditions. The system performance can be measured by parameters such as spectral efficiency, data rate and power consumption. The adaptation parameters may include the channel code rate, the modulation scheme, the transmit power, the data rate, the symbol rate, the instantaneous bit-error-rate (BER) and/or symbol-error-rate (SER).

Referring now to FIG. 21, a transceiver 300 includes an adaptive transmitter 304 and a receiver 308. The adaptive transmitter 304 includes an operating parameters generating module 310 that generates operating parameters for the transmitter 304. The operating parameters generating module 304 receives a CFO maximum value, $\epsilon$, and/or a CFO value that is measured as described above.

The operating parameters generating module 310 communicates with a channel encoding module 312, a modulating module 316, and/or a power control module 320. One or more of the following adaptive techniques are employed: The channel encoding module 312 sets the coding type, coding rate or other coding parameters based on control signals generated by the operating parameters generating module 310. The modulating module 316 sets the modulation type and/or other modulation parameters based on control signals generated by the operating parameters generating module 310. The power control module 320 sets the transmitter power level based on control signals generated by the operating parameters generating module 310.

For example, to optimize the system throughput while maintaining a target BER performance, the adaptive transmitter can be used to maintain a constant signal-to-noise ratio per information bit, $E_b/N_o$, by varying the transmitted power level, the symbol transmission rate, the constellation size, the coding rate/scheme, or any combination of these parameters in the changing channel condition. When the channel condition is favorable, the system can achieve high spectral efficiency. As the channel condition degrades, the system throughput will be reduced while the target BER performance is maintained. This is also known as adaptive modulation or rate adaptation schemes.

Analytical SNR and BER expressions have previously been developed for a given current channel estimate. These SNR and BER expressions are then used to determine the desired transmission parameters in an adaptive transmission system. Thus, the optimization of the adaptive transmission system relies on the accurate estimation of the channel estimates in order to compute the SNR, BER and/or SER.

The effect of the channel estimation error on the BER performance has also been analyzed. In practical implementations, however, in addition to the channel estimation error, the CFO can also degrade the SNR and BER performance. This effect is not accounted for by the SNR and BER measures previously proposed. Hence, use of these measures may result in inaccurate system performance estimates and compromise the performance of an adaptive transmission system.

The adaptive transmitter 304 according to some embodiments of the present invention uses the CFO as an input parameter in an adaptive transmission system. Analytical expressions that include the effect of the CFO are used to refine the system performance estimate and optimize the adaptive transmission system performance. In the previous sections, a derivation of the effect of the CFO on OFDM systems that use coherent demodulation and operate in both AWGN and multi-path fading channels was described. Closed-form SNR and SER expressions in the presence of a carrier frequency offset are derived and analyzed. The derived SNR and SER expressions can be used as parameters to optimize the adaptive transmission systems.

For example, for an adaptive single-carrier system operating in a flat-fading channel, the prior art proposes using the SNR expression, the instantaneous channel estimate at time t, denoting $H_t$, as $$SNR_0 = \frac{|H_t|^2 \sigma_X^2}{\sigma_Z^2} \tag{1}$$

where $H_t$ is the instantaneous channel estimate at time t and $$\frac{\sigma_X^2}{\sigma_Z^2}$$

is the average SNR of the channel. By extending this to an OFDM system operating in a flat fading channel, the same SNR expression given in Equation 1 can be derived for all subcarriers. In the presence of CFO, however, Equation 29 of Section 1 can be used.

$$SNR(\varepsilon) = \frac{f_N^2(\varepsilon) SNR_0}{(1 - f_N^2(\varepsilon)) SNR_0 + 1}, \tag{2}$$

where $SNR_0$ is the conventional SNR without the CFO.

As another example, for OFDM systems that use coherent demodulation and operate in a time-invariant frequency-selective channel, the conventional SNR expression proposed in the prior art can be derived to be:

$$SNR_0(k) = \frac{|H[k]|^2 \sigma_X^2}{\sigma_Z^2}, \tag{3}$$

where $H[k]$ is the channel estimate for subcarrier k. In the presence of CFO, Equation 44 in Section 1 can be used to compute the SNR for subcarrier k. That is, $$SNR(\varepsilon, k) = \frac{|C_m[0]|^2 SNR_0(k)}{\sum_{r=1}^{N-1} |C_m[r]|^2 SNR_0(k-r) + 1}. \tag{4}$$

In practical systems, the carrier frequency offset, $\epsilon$, is not known at the receiver. Otherwise, it can be corrected. However, given a system design, one can estimate the worst case (or average) residual carrier frequency offset and use this estimated value in the proposed analytical expressions.

In the preceding sections, the effect of the CFO on OFDM systems was analyzed for frequency-domain differential detection and time-domain differential detection. For differential detection systems, the channel estimates are typically not available at the receiver. However, if the measured SNR value at the receiver is available, for example, the derived SER expressions may be used to estimate the SER performance of a DPSK system.

Referring now to FIG. 22, steps performed by the adaptive transmitter are shown. Control begins in step 300. In step 302, control determines whether the transmitter is enabled. If not, control returns to step 302. Otherwise, control continues with step 306 and monitors CFO and/or $\epsilon$. In step 310, control adjusts an operating parameter of the transmitter based on the CFO and/or $\epsilon$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An adaptive receiver comprising:
   a receiver module that receives an orthogonal frequency division multiplexing (OFDM) signal;
   an operating parameters module that monitors at least one operating parameter of said receiver module and that generates a select signal based said at least one operating parameter; and
   an estimator module that selects between first and second algorithms based on said select signal and that selectively estimates a carrier frequency offset (CFO) of said OFDM signal using said one of said first and second algorithms.

2. The adaptive receiver of claim 1 wherein said at least one operating parameter includes at least one of signal to noise ratio (SNR), symbol error rate (SER), bit error rate (BER), coding rate, and modulation type.

3. The adaptive receiver of claim 1 wherein said operating parameters module selects between said first and second algorithms to reduce power consumption.

4. The adaptive receiver of claim 1 wherein said operating parameters module selects between said first and second algorithms to reduce delay.

5. The adaptive receiver of claim 1 wherein said operating parameters module selects between said first and second algorithms to reduce complexity.

6. The adaptive receiver of claim 1 wherein said receiver module performs coherent demodulation.

7. The adaptive receiver of claim 1 wherein said receiver module performs frequency differential demodulation.

8. The adaptive receiver of claim 1 wherein said receiver module performs time differential demodulation.

9. The adaptive receiver of claim 1 wherein said receiver module is a wireless receiver.

10. The adaptive receiver of claim 1 wherein said receiver module is a wired receiver.

11. The adaptive receiver of claim 1 wherein said estimator module corrects said CFO in said OFDM signal.

12. The adaptive receiver of claim 1 wherein said estimator module selectively calculates said CFO of said OFDM signal using one of said first and second algorithms.

13. The adaptive receiver of claim 1 wherein said estimator module estimates said CFO as a function of one of said at least one operating parameter.

14. The adaptive receiver of claim 1 wherein said receiver module at least one of decodes and demultiplexes said OFDM signal based on said CFO.

15. The adaptive receiver of claim 1 wherein an operating parameter value is determined based on said CFO, and
   wherein said estimator module selects one of said first and second algorithms based on said operating parameter value.

16. The adaptive receiver of claim 1 wherein said estimator module estimates said CFO based on a demodulation type of the adaptive receiver.

17. The adaptive receiver of claim 1 wherein said estimator module estimates said CFO based on a type of demodulation of the adaptive receiver, wherein demodulation type is selected from a group consisting of coherent demodulation, frequency-domain differential demodulation, and time-domain differential demodulation of the adaptive receiver.

18. The adaptive receiver of claim 1 wherein said first and second algorithms correspond to different types of demodulation of the adaptive receiver.

19. The adaptive receiver of claim 1 wherein said CFO is estimated based on a selected one of a plurality of expressions,
   wherein each of said plurality of expressions relates at least one of said operating parameters to said CFO.

20. An adaptive receiver, comprising:
   receiver means for receiving an orthogonal frequency division multiplexing (OFDM) signal;
   monitor means for monitoring at least one operating parameter of said receiver means and for generating a select signal based said at least one operating parameter; and
   estimator means for selecting between first and second algorithms based on said select signal and for selectively estimating a carrier frequency offset (CFO) of said OFDM signal using said one of said first and second algorithms.

21. The adaptive receiver of claim 20 wherein said at least one operating parameter includes at least one of signal to noise ratio (SNR), symbol error rate (SER), bit error rate (BER), coding rate, and modulation type.

22. The adaptive receiver of claim 20 wherein said monitor means selects between said first and second algorithms to reduce power consumption.

23. The adaptive receiver of claim 20 wherein said monitor means selects between said first and second algorithms to reduce delay.

24. The adaptive receiver of claim 20 wherein said monitor means selects between said first and second algorithms to reduce complexity.

25. The adaptive receiver of claim 20 wherein said receiver means performs coherent demodulation.

26. The adaptive receiver of claim 20 wherein said receiver means performs frequency differential demodulation.

27. The adaptive receiver of claim 20 wherein said receiver means performs time differential demodulation.

28. The adaptive receiver of claim 20 wherein said receiver means is a wireless receiver.

29. The adaptive receiver of claim 20 wherein said receiver means is a wired receiver.

30. The adaptive receiver of claim 20 wherein said estimator means corrects said CFO in said OFDM signal.

31. A method for operating an adaptive receiver, comprising:

receiving an orthogonal frequency division multiplexing (OFDM) signal;

monitoring at least one operating parameter of said receiver;

generating a select signal based said at least one operating parameter;

selecting between first and second algorithms based on said select signal; and selectively estimating a carrier frequency offset (CFO) of said OFDM signal using said one of said first and second algorithms.

32. The method of claim 31 wherein said at least one operating parameter includes at least one of signal to noise ratio (SNR), symbol error rate (SER), bit error rate (BER), coding rate, and modulation type.

33. The method of claim 31 further comprising selecting between said first and second algorithms to reduce power consumption.

34. The method of claim 31 further comprising selecting between said first and second algorithms to reduce delay.

35. The method of claim 31 further comprising selecting between said first and second algorithms to reduce complexity.

36. The method of claim 31 further comprising performing coherent demodulation.

37. The method of claim 31 further comprising performing frequency differential demodulation.

38. The method of claim 31 further comprising performing time differential demodulation.

39. The method of claim 31 further comprising correcting said CFO in said OFDM signal.

* * * * *